United States Patent
Yu et al.

(10) Patent No.: US 9,575,710 B2
(45) Date of Patent: Feb. 21, 2017

(54) ELECTRONIC DEVICE AND INFORMATION PROCESSING METHOD THEREOF

(71) Applicant: Lenovo (Beijing) Co., Ltd., Beijing (CN)

(72) Inventors: Junfeng Yu, Beijing (CN); Haibin Ke, Beijing (CN); Yuru Jin, Beijing (CN); Danfeng Zhang, Beijing (CN); Bing Xie, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 65 days.

(21) Appl. No.: 13/846,071

(22) Filed: Mar. 18, 2013

(65) Prior Publication Data

US 2013/0241954 A1 Sep. 19, 2013

(30) Foreign Application Priority Data

Mar. 19, 2012 (CN) .......................... 2012 1 0073057
May 14, 2012 (CN) .......................... 2012 1 0149273
May 18, 2012 (CN) .......................... 2012 1 0156965

(51) Int. Cl.
*G09G 5/12* (2006.01)
*G06F 3/14* (2006.01)
(Continued)

(52) U.S. Cl.
CPC .......... *G06F 3/1446* (2013.01); *G06F 3/0416* (2013.01); *G06F 3/04883* (2013.01);
(Continued)

(58) Field of Classification Search
CPC ....................................................... G06F 3/14
(Continued)

(56) References Cited

U.S. PATENT DOCUMENTS 6,501,441 B1 12/2002 Ludtke
7,259,740 B2 * 8/2007 Haga et al. ..................... 345/98
(Continued)

FOREIGN PATENT DOCUMENTS

CN 101369415 2/2009
CN 101674364 3/2010
(Continued)

OTHER PUBLICATIONS

First Office Action dated Aug. 19, 2015 out of corresponding Chinese Patent Application No. 201210156965.0 (15 paged including English translation).

(Continued)

*Primary Examiner* — Javid A Amini
(74) *Attorney, Agent, or Firm* — Brinks Gilson & Lione; G. Peter Nichols

(57) ABSTRACT

An electronic device, an information processing method and a method for determining display region are described and they include obtaining location relationship information of each slave electronic device with respect to the master electronic device, when connecting with at least one slave electronic device; obtaining a first size of the first display screen of the master electronic device, and a second size of the second display screen of each slave electronic device; determining a display region consisting of the first display screen and the second display screen, based on the location relationship information, the first size and the second size; and determining a first effective display region of the first display screen and a second effective display region of the second display screen which form an effective display region, based on a predetermined condition.

34 Claims, 11 Drawing Sheets

(51) Int. Cl.
*G06F 3/041* (2006.01)
*G06F 3/0488* (2013.01)
*G06T 11/60* (2006.01)
*G09G 5/00* (2006.01)

(52) U.S. Cl.
CPC .............. *G06T 11/60* (2013.01); *G09G 5/005* (2013.01); *G09G 2320/0693* (2013.01); *G09G 2356/00* (2013.01); *G09G 2370/022* (2013.01)

(58) Field of Classification Search
USPC ......................................................... 345/629
See application file for complete search history.

(56) References Cited

U.S. PATENT DOCUMENTS

| | | | |
|---|---|---|---|
| 8,253,760 B2* | 8/2012 | Sako et al. .................... | 345/629 |
| 8,675,019 B1* | 3/2014 | Feinstein ...................... | 345/634 |
| 8,732,373 B2* | 5/2014 | Sirpal et al. .................. | 710/303 |
| 2002/0088930 A1* | 7/2002 | Graham et al. .......... | 250/227.11 |
| 2005/0093768 A1 | 5/2005 | Devos | |
| 2005/0168399 A1 | 8/2005 | Palmquist | |
| 2007/0018888 A1* | 1/2007 | Fujikawa et al. ............. | 342/185 |
| 2009/0160731 A1 | 6/2009 | Schuler | |
| 2010/0053164 A1 | 3/2010 | Imai | |
| 2010/0060664 A1 | 3/2010 | Kilpatrick | |
| 2010/0066667 A1 | 3/2010 | MacDougall | |
| 2010/0066698 A1 | 3/2010 | Seo | |
| 2010/0128020 A1 | 5/2010 | Oh | |
| 2011/0066971 A1* | 3/2011 | Forutanpour et al. ........ | 715/788 |
| 2012/0001830 A1* | 1/2012 | Xia et al. ....................... | 345/1.2 |
| 2012/0004919 A1* | 1/2012 | Muth ............................. | 704/500 |
| 2012/0062475 A1 | 3/2012 | Locker | |
| 2012/0117290 A1* | 5/2012 | Sirpal et al. .................. | 710/303 |
| 2012/0127145 A1* | 5/2012 | Jang et al. ..................... | 345/211 |
| 2013/0010013 A1* | 1/2013 | Li et al. ......................... | 345/690 |
| 2013/0027431 A1* | 1/2013 | Chu ............................... | 345/644 |
| 2013/0088642 A1* | 4/2013 | Hsieh ............................ | 348/563 |

FOREIGN PATENT DOCUMENTS

| | | |
|---|---|---|
| CN | 101676853 | 3/2010 |
| CN | 102222493 | 10/2011 |
| EP | 1 868 078 | 12/2007 |
| WO | WO 2012/044801 | 4/2012 |

OTHER PUBLICATIONS

First Office Action dated Nov. 30, 2015 out of corresponding Chinese Patent priority Application No. 201210149273.3 (10 pages including English translation).

First Office Action dated Sep. 29, 2015 out of corresponding Chinese Patent priority Application No. 201210073057.5 (16 pages including English translation).

Second Office Action dated Mar. 28, 2016 out of Chinese priority Application No. 201210156965.0 (18 pages including English translation).

Second Office Action dated Aug. 8, 2016 out of corresponding Chinese Application No. 201210149273.3 (9 pages including English translation).

* cited by examiner

ELECTRONIC DEVICE AND INFORMATION PROCESSING METHOD THEREOF

This application claims priority to CN201210073057.5 filed on Mar. 19, 2012; CN201210149273.3 filed on May 14, 2012; and CN201210156965.0 filed on May 18, 2012, the entire contents of each are incorporated herein by reference.

BACKGROUND

The present disclosure relates to the field of information processing, and particularly to an electronic device and an information processing method thereof.

The current electronic devices such as the mobile terminal, the tablet, etc. usually operate in a stand-alone mode. Therefore, usually, the electronic device performs operations such as unlocking, locking, etc., only based on corresponding input, such as gesture operations by user, received by the electronic device itself.

Recently, with the development of the technology of splicing multiple electronic devices to form a large display system, the electronic device may operate in two work modes of the stand-alone mode and a link mode. It becomes a problem about how to perform the operation corresponding to the work mode based on the received input in two different work modes.

For example, in the link mode, different from the situation where the individual electronic device is unlocked/locked by a gesture operation on the single electronic device, it is often desirable to unlock/lock the display system by a gesture operation in the operation region of the display system consisted of multiple electronic devices from the user's perspective. Therefore, it becomes a problem about how to perform corresponding unlock/lock operation in response to the user input in different work modes by the electronic device.

Moreover, currently, the big screen display system is consisted of multiple display units and image controllers in the current multi-screen splicing technology, and is generally used for an ultra screen display for one picture, and for multi-window display for multiple pictures.

It has drawbacks in that the splicing of the screens is fixed and cannot change with time; all the input signals needs to be processed by the image controller to be allocated to output to each screen display unit, and additional image controllers are needed.

Therefore, this kind of big screen splicing technology is not suitable for the screen splicing of Hybrid system consisted of separate devices, such as a hybrid system formed of multiple mobile phones.

In addition, in the prior art, for the hybrid system formed of separate devices, once the separate devices are spliced, their display mode is correspondingly fixed. Usually there is only one display mode, which is not suitable for display in different modes according to different properties of the display content.

SUMMARY

In view of this, the present disclosure provides an electronic device, an information processing method thereof, and a method for determining display region and switching display mode, which can improve the display effect, perform in at least two work modes, and perform the operation corresponding to the work mode in response to the user input.

Further, the present disclosure provides an electronic device and an information processing method thereof, which can not only combine display screens of multiple electronic devices into a relatively big display region conveniently, but also use different sub-regions of the display region to display images for different purposes.

According to one aspect of the present disclosure, a method for determining display region is provided, applied in a master electronic device connectable to at least one slave electronic device, the master electronic device comprising a first display screen, each slave electronic device of the at least one slave electronic device comprising a second display screen, the method comprising steps of: obtaining location relationship information of each slave electronic device of the at least one slave electronic device with respect to the master electronic device, when connecting with the at least one slave electronic device; obtaining a first size of the first display screen of the master electronic device, and a second size of the second display screen of each slave electronic device of the at least one slave electronic device; determining a display region consisted of the first display screen of the first size and the second display screen of the second size, based on the location relationship information, the first size and the second size; and determining a first effective display region of the first display screen and a second effective display region of the second display screen, based on a predetermined condition, wherein the first effective display region and the second effective display region form an effective display region within the display screen.

The step of obtaining location relationship information of each slave electronic device of the at least one slave electronic device with respect to the master electronic device, when connecting with the at least one slave electronic device comprises: re-obtaining the location relationship information of each slave electronic device of the at least one slave electronic device with respect to the master electronic device, based on the detection of a location change of any electronic device; and the step of determining the display region, based on the location relationship information, the first size and the second size comprises: determining the display region based on the re-obtained location relationship information, the first size and the second size.

The step of obtaining location relationship information of each slave electronic device of the at least one slave electronic device with respect to the master electronic device, when connecting with the at least one slave electronic device comprises: obtaining location relationship information with respect to each slave electronic device of the at least one slave electronic device, based on the detection of the location of the at least one slave electronic device; or receiving location information transmitted by each slave electronic device of the at least one slave electronic device, and obtaining the location relationship information with respect to each slave electronic device of the at least one slave electronic device.

The predetermined condition is to determine the longest side and the widest side of the display region, and to determine a regular shape according to the longest side or the widest side.

The step of obtaining a second size of the second display screen of each slave electronic device of the at least one slave electronic device comprises: obtaining the second size of the second display screen of each slave electronic device of the at least one slave electronic device, based on size information transmitted by each slave electronic device of the at least one slave electronic device; or obtaining the second size of the second display screen of each slave electronic device of the at least one slave electronic device, based on a set coordinate system.

The first display screen of the master electronic device displays all objects in the first effective display region, and the second display screen of each slave electronic device of the at least one slave electronic device displays all objects in the second effective display region.

The first display screen and/or the second display screen are/is touch screen(s), when the first display screen and/or the second display screen receive(s) the first operation, the master electronic device or the at least one slave electronic device responds to the first operation, generates a response result, and the master electronic device performs a corresponding operation according to the response result.

The master electronic device determines objects to be displayed in the first display screen and the second display screen respectively according to the effective display region, and instructs the first display screen and the second display screen to display the objects determined to be displayed respectively.

According to another aspect of the present disclosure, a method for switching display modes is provided, applied to a master electronic device connectable to at least one slave electronic device, the method comprising steps of: obtaining information to be displayed when the display mode is to be switched; judging whether there is at least one other display mode than the current display mode, when connecting with at least one slave electronic device; and switching to one display mode of the other display mode when the judging result is positive.

According to another aspect of the present disclosure, an electronic device connectable to at least one slave electronic device is provided, the electronic device comprising a first display screen, each slave electronic device of the at least one slave electronic device comprising a second display screen, the electronic device comprising: a first obtaining module for obtaining location relationship information of each slave electronic device of the at least one slave electronic device with respect to the master electronic device, when connecting with the at least one slave electronic device; a second obtaining module for obtaining a first size of the first display screen of the master electronic device, and a second size of the second display screen of each slave electronic device of the at least one slave electronic device; a first determining module for determining a display region consisted of the first display screen of the first size and the second display screen of the second size, based on the location relationship information, the first size and the second size; and a second determining module for determining a first effective display region of the first display screen and a second effective display region of the second display screen, based on a predetermined condition, wherein the first effective display region and the second effective display region form the effective display region within the display screen.

The first obtaining module is further used for re-obtaining the location relationship information of each slave electronic device of the at least one slave electronic device with respect to the master electronic device, based on the detection of a location change of any electronic device; and the second determining module is further used for determining the display region, based on the re-obtained location relationship information, the first size and the second size.

The first obtaining module is further used for obtaining location relationship information with respect to each slave electronic device of the at least one slave electronic device, based on the detection of the location of the at least one slave electronic device; or receiving location information transmitted by each slave electronic device of the at least one slave electronic device, and obtaining location relationship information with respect to each slave electronic device of the at least one slave electronic device.

The predetermined condition is to determine the longest side and the widest side of the display region, and to determine a regular shape according to the longest side or the widest side.

The second obtaining module is used for obtaining the second size of the second display screen of each slave electronic device of the at least one slave electronic device, based on size information transmitted by each slave electronic device of the at least one slave electronic device; or obtaining the second size of the second display screen of each slave electronic device of the at least one slave electronic device, based on a set coordinate system.

The first display screen of the master electronic device displays all objects in the first effective display region, and the second display screen of each slave electronic device of the at least one slave electronic device displays all objects in the second effective display region.

The electronic device further comprises a generating module and an executing module; the generating module is used to respond to a first operation to generate a response result, when the first display screen is a touch screen and the first display screen receives the first operation; the executing module is used to perform a corresponding operation according to the response result; when the second display screen is a touch screen and the second display screen receives the first operation, the at least one slave electronic device responds to the first operation to generate a response result, and the executing module is further used to perform a corresponding operation according to the response result.

The electronic device further comprises a third determining module for determining objects to be displayed in the first display screen and the second display screen respectively according to the effective display region, and instructing the first display screen and the second display screen to display the objects determined to be displayed respectively.

According to another aspect of the present disclosure, an electronic device applied to a master electronic device connectable to at least one slave electronic device is provided, the electronic device comprising: a third obtaining module for obtaining information to be displayed when the display mode is to be switched; a judging module for judging whether there is at least one other display mode than the current display mode, when connecting with at least one slave electronic device; and a switching module for switching to one display mode of the other display mode when the judging result is positive.

According to another aspect of the present disclosure, an information processing method applied to an electronic device is provided, the information processing method comprising: detecting a touch gesture by user to obtain a first touch gesture track; acquiring state information of the electronic device; judging whether the electronic device is in a first work mode or a second work mode, based on the state information; receiving verification information from at least one second electronic device, when the electronic device is in the first work mode; generating a corresponding instruction based on the first touch gesture track and the verification information; and causing the electronic device to perform an operation corresponding to the instruction.

The verification information is a second touch gesture track detected by the second electronic device; and the step of generating the corresponding instruction comprises: verifying whether the first touch gesture track matches with a first preset track to obtain a first match result; verifying whether the second touch gesture track matches with a second preset track to obtain a second match result; and generating a first switching instruction as the instruction, when the first match result indicates that the first touch gesture track matches with the first preset track, and the second match result indicates that the second touch gesture track matches with the second preset track.

The verification information is a second match result obtained from the second electronic device by obtaining a second touch gesture track and verifying whether the second touch gesture track matches with a second preset track, and the verification information is transmitted to the electronic device by the second electronic device; and the step of generating the corresponding instruction comprises: verifying whether the first touch gesture track matches with a first preset track to obtain a first match result; and generating a first switching instruction as the instruction, when the first match result indicates that the first touch gesture track matches with the first preset track, and the second match result indicates that the second touch gesture track matches with the second preset track.

The verification information is a second touch gesture track detected by the second electronic device; and the step of generating the corresponding instruction comprises: obtaining a combining track based on the first touch gesture track and the second touch gesture track; verifying whether the combining track matches with a preset combining track to obtain a match result; and generating a first switching instruction as the instruction, when the match result indicates that the combining track matches with the preset combining track.

When the instruction is a first switching instruction, the step of causing the electronic device to perform an operation corresponding to the instruction comprises: causing the electronic device into a third work mode, wherein, the electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

The information processing method further comprises: transmitting the instruction to the second electronic device, wherein the second electronic device performs an operation corresponding to the instruction.

The second electronic device is in the first work mode; and when the instruction is a first switching instruction, the step of causing the second electronic device to perform an operation corresponding to the instruction comprises: causing the second electronic device into a third work mode, wherein, the second electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

The information processing method further comprises: when the electronic device is in the second work mode, verifying whether the first touch gesture track matches with a third preset track different from the first preset track; and generating a second switching instruction, when the first touch gesture track matches with the third preset track; and the step of causing the electronic device to perform an operation corresponding to the instruction comprises: causing the electronic device into a fourth work mode in response to the second switching instruction, wherein, the electronic device performs an instruction in a first instruction set when in a first work mode, performs an instruction in a second instruction set when in a second work mode, and performs an instruction in a fourth instruction set when in a fourth work mode, the number of instructions in the first instruction set is less than that in the fourth instruction set, and the number of instructions in the second instruction set is less than that in the fourth instruction set.

According to another aspect of the present disclosure, an electronic device is provided, comprising: a detecting module for detecting a touch gesture by user to obtain a first touch gesture track; an acquiring module for acquiring state information of the electronic device; a judging module for judging whether the electronic device is in a first work mode or a second work mode, based on the state information; a receiving module for receiving verification information from at least one second electronic device, when the electronic device is in the first work mode; a generating module for generating a corresponding instruction based on the first touch gesture track and the verification information; and an executing module for causing the electronic device to perform an operation corresponding to the instruction.

The verification information is a second touch gesture track detected by the second electronic device; and the generating module comprises: a first verifying module for verifying whether the first touch gesture track matches with a first preset track to obtain a first match result; a second verifying module for verifying whether the second touch gesture track matches with a second preset track to obtain a second match result; and a first instruction generating module for generating a first switching instruction as the instruction, when the first match result indicates that the first touch gesture track matches with the first preset track, and the second match result indicates that the second touch gesture track matches with the second preset track.

The verification information is a second match result obtained from the second electronic device by obtaining a second touch gesture track and verifying whether the second touch gesture track matches with a second preset track, and the verification information is transmitted to the electronic device by the second electronic device; and the generating module comprises: a first verifying module for verifying whether the first touch gesture track matches with a first preset track to obtain a first match result; and a first instruction generating module for generating a first switching instruction as the instruction, when the first match result indicates that the first touch gesture track matches with the first preset track, and the second match result indicates that the second touch gesture track matches with the second preset track.

The verification information is a second touch gesture track detected by the second electronic device; and the generating module comprises: a combing module for obtaining a combining track based on the first touch gesture track and the second touch gesture track; a verifying module for verifying whether the combining track matches with a preset combining track to obtain a match result; and a first instruction generating module for generating a first switching instruction as the instruction, when the match result indicates that the combining track matches with the preset combining track.

When the instruction is a first switching instruction, the executing module is used for causing the electronic device into a third work mode, wherein, the electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

The electronic device further comprises: a transmitting module for transmitting the instruction to the second electronic device, wherein the second electronic device performs an operation corresponding to the instruction.

The second electronic device is in the first work mode; and when the instruction is a first switching instruction, the step of causing the second electronic device to perform an operation corresponding to the instruction comprises: causing the second electronic device into a third work mode, wherein, the second electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

The electronic device further comprises: a third verifying module for verifying whether the first touch gesture track matches with a third preset track different from the first preset track when the electronic device is in the second work mode; and a second instruction generating module for generating a second switching instruction, when the first touch gesture track matches with the third preset track; and the executing module causes the electronic device into a fourth work mode in response to the second switching instruction, wherein, the electronic device performs an instruction in a first instruction set when in a first work mode, performs an instruction in a second instruction set when in a second work mode, and performs an instruction in a fourth instruction set when in a fourth work mode, the number of instructions in the first instruction set is less than that in the fourth instruction set, and the number of instructions in the second instruction set is less than that in the fourth instruction set.

According to another aspect of the present disclosure, an information processing method applied to an electronic device is provided, the information processing method comprising steps of: acquiring connection information of the connection between the electronic device and at least one second electronic device, when the electronic device is in a first work mode; forming a display system with the at least one second electronic device, when a predetermined condition is met; and causing the electronic device into a second work mode; wherein, a first image based on a first data of the electronic device itself is displayed on a display region of the electronic device in the first work mode; in the second work mode, the display region of the electronic device is divided into a first sub-region and a second sub-region, the display system has a combining display region containing the first sub-region, and a first combining image based on data of a master device among the electronic device and the second electronic device is displayed on the combining display region.

The information processing method further comprises: acquiring a second data for displaying on the second sub-region from one of the electronic device and the second electronic device in the second work mode; and displaying a second image on the second sub-region based on the second data.

When the electronic device is the master device, the method further comprises: detecting a gesture operation on the second sub-region; generating a second combining image corresponding to the gesture operation; and causing the combining display region to display the second combining image.

When the second electronic device is the master device, the method further comprises: detecting a gesture operation on the second sub-region; and transmitting information on the gesture operation to the second electronic device; wherein, the second electronic device generates a second combining image corresponding to the gesture operation, and causing the combining display region to display the second combining image.

The second image is an image unrelated to the first combining image.

The second image is a thumbnail image corresponding to the first combining image, and the information processing method further comprises: detecting a gesture operation on the thumbnail image; generating a second combining image corresponding to the gesture operation; and causing the combining display region to display the second combining image.

The information processing method further comprises: disabling display elements corresponding to the second sub-region in the electronic device.

The electronic device comprises a first display screen, the second electronic device comprises a second display screen; and the step of forming a display system with the second electronic device comprises: obtaining location relationship information of the second electronic device with respect to the electronic device; obtaining first size information of the first display screen of the electronic device and second size information of the second display screen of the second electronic device; determining the display region according to the location relationship information, the first size information and the second size information; wherein, the display region is formed of the first display screen and the second display screen; and determining the combining display region in the display region.

According to another aspect of the present disclosure, an electronic device is provided, comprising: a connection information acquiring module for acquiring connection information of the connection between the electronic device and at least one second electronic device, when the electronic device is in a first work mode; a judging module for judging whether the connection information meets a predetermined condition; a forming module for forming a display system with the at least one second electronic device, when a predetermined condition is met; and a work mode processing module for causing the electronic device into a second work mode; wherein, a first image based on a first data of the electronic device itself is displayed on a display region of the electronic device in the first work mode; in the second work mode, the display region of the electronic device is divided into a first sub-region and a second sub-region, the display system has a combining display region containing the first sub-region, and a first combining image based on data of a master device among the electronic device and the second electronic device is displayed on the combining display region.

The electronic device further comprises: a display data acquiring module for acquiring a second data for displaying on the second sub-region from one of the electronic device and the second electronic device in the second work mode; and a display processing module for displaying a second image on the second sub-region based on the second data.

When the electronic device is the master device, the electronic device further comprises: a detecting module for detecting a gesture operation on the second sub-region; a generating module for generating a second combining image corresponding to the gesture operation; and a display processing module for causing the combining display region to display the second combining image.

When the second electronic device is the master device, the electronic device further comprises: a detecting module for detecting a gesture operation on the second sub-region; and a transmitting module for transmitting information on the gesture operation to the second electronic device; wherein, the second electronic device generates a second combining image corresponding to the gesture operation, and causing the combining display region to display the second combining image.

The second image is a thumbnail image corresponding to the first combining image, and the electronic device further comprises: a detecting module for detecting a gesture operation on the thumbnail image; a generating module for generating a second combining image corresponding to the gesture operation; and a display processing module for causing the combining display region to display the second combining image.

The electronic device further comprises: a disabling module for disabling display elements corresponding to the second sub-region in the electronic device.

The electronic device comprises a first display screen, the second electronic device comprises a second display screen; and the forming module comprises: a location information obtaining module for obtaining location relationship information of the second electronic device with respect to the electronic device; a size information obtaining module for obtaining first size information of the first display screen of the electronic device and second size information of the second display screen of the second electronic device; a first determining module for determining the display region according to the location relationship information, the first size information and the second size information; wherein, the display region is formed of the first display screen and the second display screen; and a second determining module for determining the combining display region in the display region.

In the embodiments of the present disclosure, the location relationship information of each slave electronic device of the at least one slave electronic device with respect to the master electronic device is obtained, when connecting with the at least one slave electronic device. The first size of the first display screen of the master electronic device, and the second size of the second display screen of each slave electronic device of the at least one slave electronic device are obtained. The display region consisted of the first display screen of the first size and the second display screen of the second size is determined, based on the location relationship information, the first size and the second size. The first effective display region of the first display screen and the second effective display region of the second display screen are determined based on a predetermined condition, wherein the first effective display region and the second effective display region form an effective display region within the display screen. When there are multiple electronic devices for slicing, at least one effective display region can be determined based on different sizes of different display screens of different electronic devices to display the display objects, so that the effective display region can be determined according to the splicing locations of the multiple electronic devices in real-time, the display quality is improved, and the display effect is improved.

In addition, in the electronic device and the information processing method thereof according to the embodiments of the present disclosure, the electronic device can operate at least in two work modes of the stand-alone mode and the link mode. The electronic device and the information processing method thereof generate corresponding instructions based on the detected user touch gesture and perform operations corresponding to the instruction, when it is judged that the electronic device is in the stand-alone mode. On the other hand, the electronic device and the information processing method thereof generate corresponding instructions based on the detected user touch gesture and the verification information from at least one other electronic device, and perform operations corresponding to the instruction, when it is judged that the electronic device is in the link mode.

Thereby, the electronic device and the information processing method thereof can operate in at least two work modes, and can perform different processes based on the work mode of the electronic device when the user touch gesture is detected. Further, the electronic device and the information processing method thereof can also control other electronic devices to perform corresponding operations, so that the display consistency and the operation consistency of the display system formed of the electronic device and the other electronic devices are maintained.

Moreover, in the electronic device and the information processing method thereof according to the embodiments of the present disclosure, the display screens of multiple electronic devices can be combined into a relatively big display region conveniently, and they need not to be formed in a fix way, and can be adjusted when needed, so it is suitable for the screen splicing of the system formed of separate devices. Moreover, in the embodiments of the present disclosure, screens of multiple electronic devices can be combined without the configuration of additional image controller, so that the product cost is saved.

Moreover, in the electronic device and the information processing method thereof, not only display screens of multiple electronic devices can be combined into a relatively big display region conveniently, but also different sub-regions of the display region can be used to display images for different purposes, thereby the individual display regions of the multiple display screens of the multiple electronic devices can be fully used, and the user experience is improved.

DETAILED DESCRIPTION

The embodiments of the present disclosure will be described in detail with reference to the figures in the following.

In the embodiments of the present disclosure, location relationship information of each slave electronic device of the at least one slave electronic device with respect to the master electronic device is obtained, when connecting with the at least one slave electronic device. A first size of the first display screen of the master electronic device, and a second size of the second display screen of each slave electronic device of the at least one slave electronic device are obtained. A display region consisted of the first display screen of the first size and the second display screen of the second size is determined based on the location relationship information, the first size and the second size. A first effective display region of the first display screen and a second effective display region of the second display screen is determined based on a predetermined condition, wherein the first effective display region and the second effective display region form an effective display region within the display screen. When there are multiple electronic devices for slicing, at least one effective display region can be determined based on different sizes of different display screens of different electronic devices to display the display objects, so that the effective display region can be determined according to the splicing locations of the multiple electronic devices in real-time, the display quality is improved, and the display effect is improved.

Figure 1:
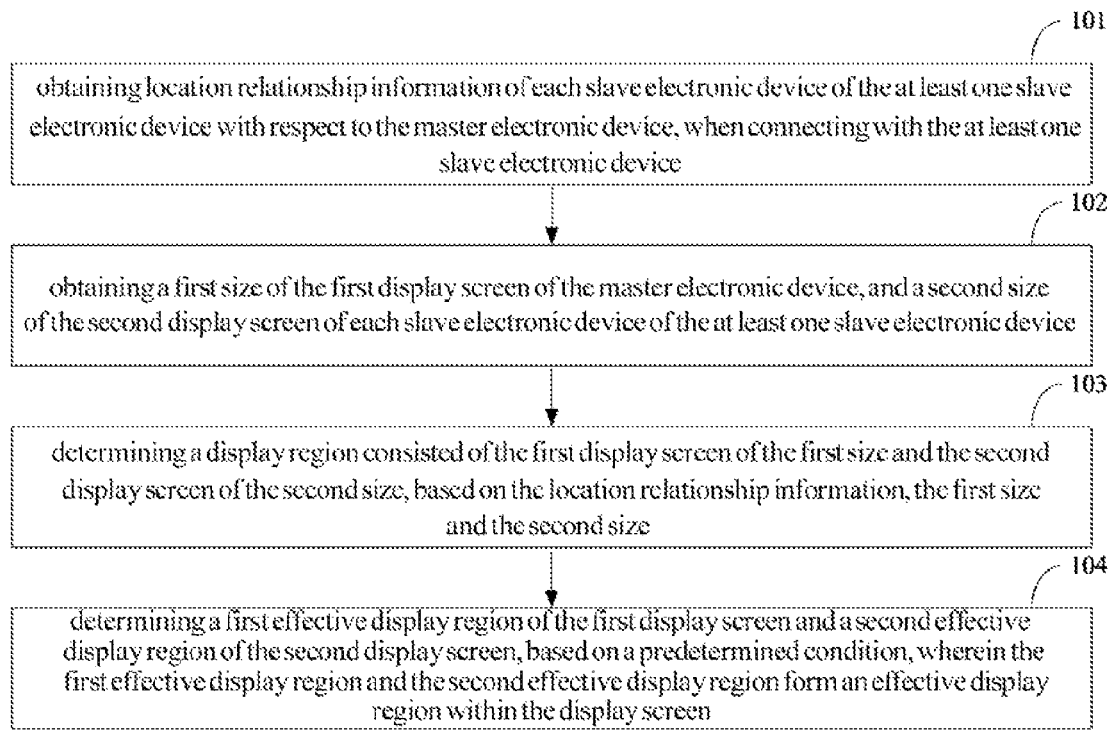
FIG. 1 shows a main flowchart of the method for determining display region in an embodiment of the present disclosure.

Referring to FIG. 1, the flow of the method for determining display region in an embodiment of the present disclosure is mainly as follows. The method can be applied in a master electronic device connectable to at least one slave electronic device. The master electronic device comprises a first display screen. Each slave electronic device of the at least one slave electronic device comprises a second display screen.

Step 101: obtaining location relationship information of each slave electronic device of the at least one slave electronic device with respect to the master electronic device, when connecting with the at least one slave electronic device.

When the multiple electronic devices are to be spliced, any one electronic device may be used as the master electronic device. When the master electronic device knows that it is connected to at least one slave electronic device, it can obtain the location relationship information of each slave electronic device of the at least one slave electronic device with respect to the master electronic device itself. When the multiple electronic devices are to be spliced, the master electronic device may transmit a request message to each slave electronic device of the at least one slave electronic device, to request location relationship information of each slave electronic device of the at least one slave electronic device with respect to the master electronic device. Alternatively, when the multiple electronic devices are to be spliced, each slave electronic device of the at least one slave electronic device may transmit the location relationship information of each slave electronic device of the at least one slave electronic device with respect to the master electronic device to the master electronic device, respectively.

When any one slave electronic device of the at least one slave electronic device spliced with the master electronic device changes its location, or the master electronic device changes its location, the location relationship information of each slave electronic device of the at least one slave electronic device with respect to the master electronic device may be re-obtained. For example, when any one slave electronic device of the at least one slave electronic device changes its location, or the master electronic device changes its location, the master electronic device may retransmit the request message to each slave electronic device of the at least one slave electronic device, to re-request the location relationship information of each slave electronic device of the at least one slave electronic device with respect to the master electronic device. Alternatively, when any one slave electronic device of the at least one slave electronic device changes its location, the master electronic device may transmit the request message to the slave electronic device with the location changed, to request the location relationship information of this slave electronic device with respect to the master electronic device. Alternatively, when any one slave electronic device of the at least one slave electronic device spliced with the master electronic device changes its location, or the master electronic device changes its location, each slave electronic device of the at least one slave electronic device may transmit the new location relationship information of itself with respect to the master electronic device to the master electronic device. Alternatively, when any one slave electronic device of the at least one slave electronic device spliced with the master electronic device changes its location, the slave electronic device with its location changed may transmit the new location relationship information of itself with respect to the master electronic device to the master electronic device.

Step 102: obtaining a first size of the first display screen of the master electronic device, and a second size of the second display screen of each slave electronic device of the at least one slave electronic device.

After obtaining the location relationship of each slave electronic device of the at least one slave electronic device with respect to the master electronic device, the first size of the first display screen of the master electronic device, and the second size of the second display screen of each slave electronic device of the at least one slave electronic device may also obtained.

The master electronic device may determine the first size of the first display screen directly.

The second size of the second display screen of each slave electronic device of the at least one slave electronic device may be obtained from the size information transmitted from each slave electronic device of the at least one slave electronic device. Alternatively, the second size of the second display screen of each slave electronic device of the at least one slave electronic device may be obtained from a set coordinate system.

Figure 2A:
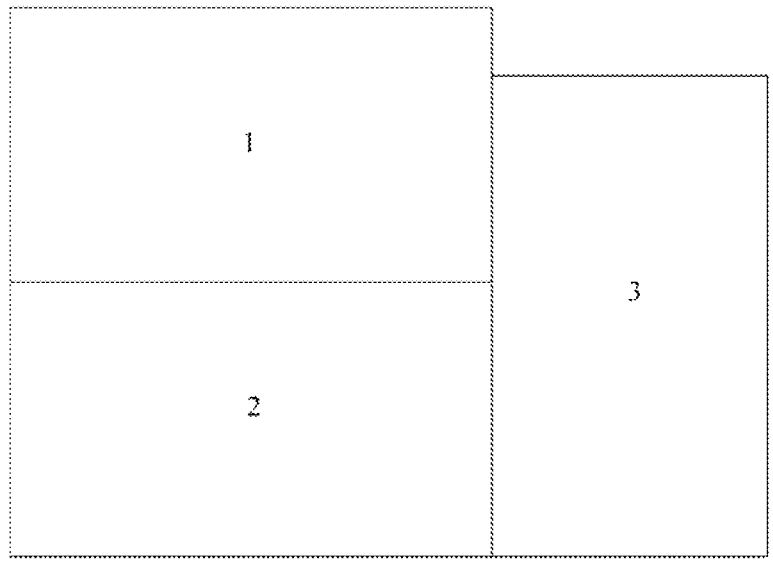
FIG. 2A is a schematic diagram of one way of splicing of three electronic devices in the embodiment of the present disclosure.

For example, when each slave electronic device transmits its location information to the master electronic device, the second size of the second display screen may also be transmitted to the master electronic device, so that the master electronic device knows about the second size of the second display screen. Alternatively, the master electronic device may transmit a size request message to each slave electronic device, to request the second size of the second display screen. Alternatively, the master electronic device may establish a coordinate system. For example, as shown in FIG. 2A, which is a schematic diagram when three electronic devices are to be spliced, the electronic device with the reference number 1 may be referred to as the first electronic device, the electronic device with the reference number 2 may be referred to as the second electronic device, and the electronic device with the reference number 3 may be referred to as the third electronic device. The first electronic device may be the master electronic device, and the second electronic device as well as the third electronic device may be the slave electronic devices. The sizes of the first electronic device and the second electronic device are the same in FIG. 2A. The rectangle block is illustrated as the display screen. For example, the first electronic device may establish a coordinate system, with the origin being any point in its control area. In the embodiment of the present disclosure, the left top point of the first display screen is selected as the origin of the coordinate system, for example. Then, the first electronic device may not only determine the location relationship of the at least one slave electronic device with respect to itself based on the coordinate system directly, but also obtain the size of the first display screen itself, the size of the second display screen of the second electronic device, and the size of the third display screen of the third electronic device.

Step 103: determining a display region consisted of the first display screen of the first size and the second display screen of the second size, based on the location relationship information, the first size and the second size.

The display region may be determined according to the location relationship information, the first size and the second size. The display region may be formed of display screens of the electronic devices. For example, the display region in FIG. 2A is formed of the first display screen of the first electronic device of the first size, the second display screen of the second electronic device of the second size, and the third display screen of the third electronic device of the third size. The display region may be of a regular shape or an irregular shape. The display region in FIG. 2A is for example of an irregular shape.

When any one slave electronic device of the at least one slave electronic device spliced with the main electronic device changes its location, or the main electronic device changes its location, and the location relationship information of each slave electronic device of the at least one slave electronic device with respect to the master electronic device is re-obtained, the display region may be determined based on the re-obtained location relationship information, the first size and the second size. When any electronic device changes its location, the determined shape of the display region may be different from the determined shape of the display region with no change to the location.

Step 104: determining a first effective display region of the first display screen and a second effective display region of the second display screen, based on a predetermined condition, wherein the first effective display region and the second effective display region form an effective display region within the display screen.

The predetermined condition may be to determine the longest side and the widest side of the display region, and to determine a regular shape according to the longest side or the widest side. The region of this regular shape is the effective display region. The effective display region may comprise the first effective display region and/or the second effective display region. For example, as shown in the schematic diagram of the splicing of the electronic devices in FIG. 2A, if a regular shape is to be determined according to the widest side of the display region, then the regular shape may not comprise the third effective display region of the third electronic device.

In the embodiments of the present disclosure, the longest side and the widest side may be determined in the following way. The master electronic device may establish a coordinate system, and obtain the longest distance in the X-axis of the spliced electronic devices, and the longest distance in the Y-axis of the spliced electronic devices. The longest distance in the X-axis may be the longest side, and the longest distance in the Y-axis may be the widest side.

First, at least one effective long side and at least one effective wide side of the display region may be determined according to the first size and the second size. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device. Since the first electronic device and the second electronic device are arranged in parallel to each other, the length of the effective side determined according to the long side of the second electronic device and the wide side of the third electronic device is the same as that of the first effective side. The first effective side and the fourth effective side are both long sides, and the first effective side may be determined as the longest side of the display region. The second effective side and the third effective side are both wide sides, and the second effective side may be determined as the widest side of the display region.

Continuing to refer to FIG. 2A as an example, different effective display regions may be determined according to the determined longest side of the display region or the widest side of the effective display region.

Figure 2B:
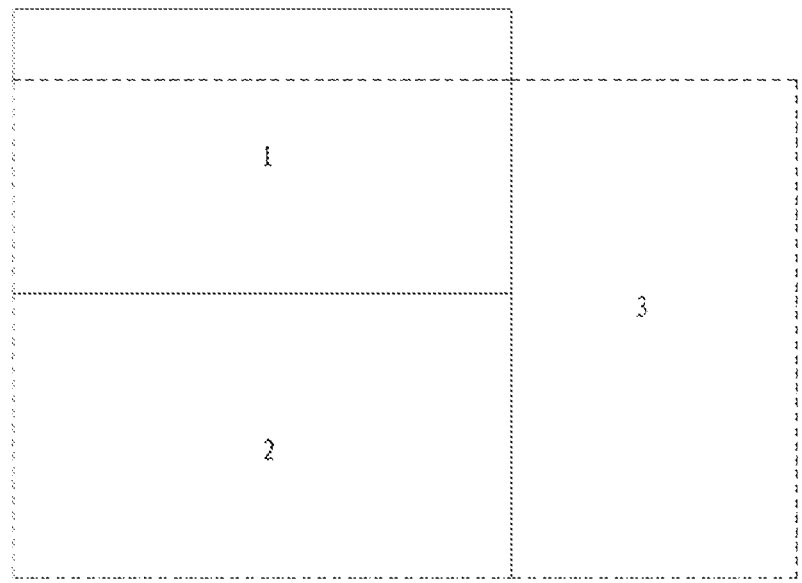
FIG. 2B is a schematic diagram of the effective display region of the one way of splicing of three electronic devices in the embodiment of the present disclosure.
Figure 2C:
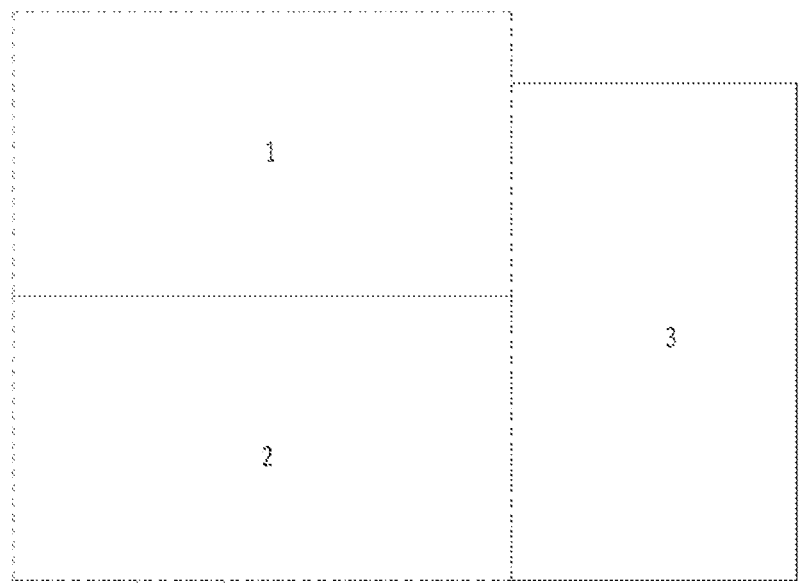
FIG. 2C is a schematic diagram of another effective display region of the one way of splicing of three electronic devices in the embodiment of the present disclosure.

For example, if the longest side of the display region is selected as the reference, the first effective side may be determined as the long side of the effective display region, the third effective side may be determined as the wide side of the effective display region. As shown in FIG. 2B, the section surrounded with the dotted line is the effective display region. If the widest side of the display region is selected as the reference, the second effective side may be determined as the wide side of the effective display region. The fourth effective side is the long side of the effective display region. As shown in FIG. 2C, the section surrounded with the dotted line is the effective display region.

Continuing to refer to FIG. 2A as an example, alternatively, different effective display regions may be determined according to the determined first effective side, the second effective side, the third effective side and the fourth effective side, respectively.

For example, if the effective display region is determined referring to the first display screen, the first effective side may be determined as the effective long side of the effective display region, and the third effective side may be determined as the effective wide side of the effective display region. Alternatively, the fourth effective side may be determined as the effective long side of the effective display region, and the second effective side may be determined as the effective wide side of the effective display region.

If the effective display region is determined referring to the second display screen of the second electronic device, the first effective side may be determined as the effective long side of the effective display region, and the third effective side may be determined as the effective wide side of the effective display region. Alternatively, the fourth effective side may be determined as the effective long side of the effective display region, and the second effective side may be determined as the effective wide side of the effective display region.

If the effective display region is determined referring to the third display screen of the third electronic device, the first effective side may be determined as the effective long side of the effective display region, and the third effective side may be determined as the effective wide side of the effective display region.

There are many ways to determine the effective display region, and the determined effective display regions are different accordingly. The user may make the choice as necessary, to choose different effective display regions according to the different properties of the display objects, so as to achieve the best display effect.

After determining the effective display region, the first display screen displays all objects in the first effective display region, and the second display screen displays all objects in the second effective display region. For example, as shown in FIG. 2A, when determining the first effective side as the effective long side of the effective display region and the third effective side as the effective wide side of the effective display region, a part of the first display screen of the first electronic device is within the first effective display region, and the other part is not within the effective display region. Then, the first electronic device may control the first effective display region of the first display screen to display all objects, and may control the other part of the non-effective display region not to display any object.

Figure 3:
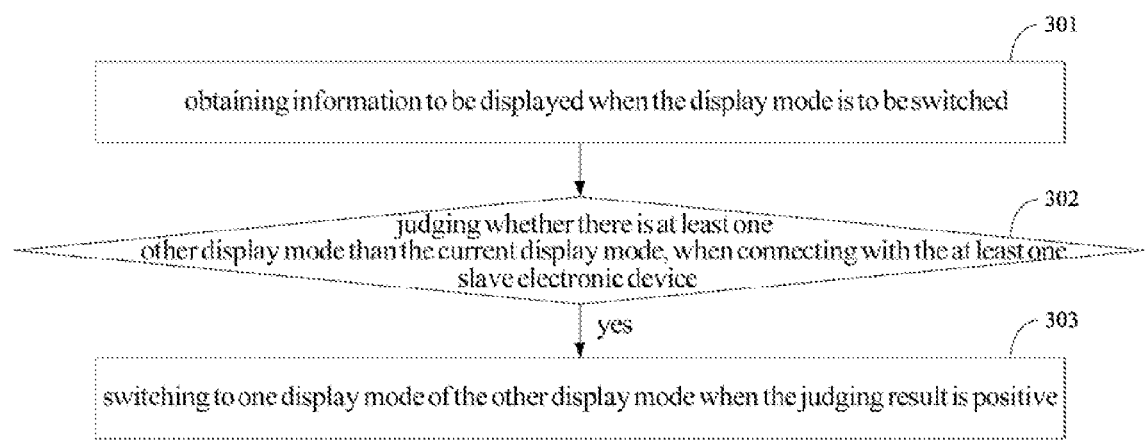
FIG. 3 is a main flowchart of the method for switching display mode in an embodiment of the present disclosure.

Referring to FIG. 3, the present disclosure also provides a method for switching display modes, which can be applied to a master electronic device connectable to at least one slave electronic device. The detailed flow of the method is as follows.

Step 301: obtaining information to be displayed when the display mode is to be switched;

When the display mode is to be switched, the master electronic device may firstly obtain the information to be displayed. For example, the display mode may be switched according to the user instruction. Alternatively, the display mode may be switched automatically according to the property of the information to be displayed.

Step 302: judging whether there is at least one other display mode than the current display mode, when connecting with at least one slave electronic device;

When multiple electronic devices are spliced and the effective display region is determined, each effective display region may correspond to a display mode, and switching may be done among the different display modes. If at least one other different effective display region is determined, it can be determined that there is at least one display mode.

Step 303: switching to one display mode of the other display mode when the judging result is positive.

If it is judged that there is no other display mode than the current display mode, the switching may not be done. If it is judged that there are other display modes, the required display mode may be selected from the other display modes according to the user instruction. Alternatively, the required display mode may be selected from the other display modes automatically according to the property of the information to be displayed. If it is judged that there is no proper display mode in the other display modes, the switching may not be done.

In the embodiments of the present disclosure, it is determined that there are other display modes than the current display mode, for example. For example, if the first effective side is determined as the effective long side of the effective display region, and the third effective side is determined as the effective wide side of the effective display region, the effective display region may be referred to as the third effective display region. If the fourth effective side is determined as the effective long side of the effective display region, and the second effective side is determined as the effective wide side of the effective display region, the effective display region may be referred to as the fourth effective display region. If the second effective side is determined as the effective wide side of the effective display region, and the fourth effective side is determined as the effective long side of the effective display region, the effective display region may be referred to as the fifth effective display region, and so on.

For example, if the current display mode is the second display mode corresponding to the fourth effective display region, and the object to be displayed is a video suitable for watching in a traverse direction to achieve a good watching experience. On the other hand, the third effective display region is a traverse screen corresponding to the first display mode. Then, the first effective side may be selected as the effective long side of the effective display region, and the third effective side may be selected as the effective wide side of the effective display region. That is, the third effective display region is determined as the effective display region. Switching is done from the current second display mode to the first display mode for display.

For example, if the current display mode is the first display mode corresponding to the third effective display region, and the object to be displayed is a video suitable for watching in a traverse direction to achieve a good watching experience. The master electronic device judges whether there is at least one other display mode than the current display mode according to the user instruction, and the judge result is positive. The user intends to find an effective display region with a width wider than the third effective display region. The master electronic device may know that the width of the third effective display region is the widest among all the effective display regions. Then, the master electronic device may continue to switch or not to switch according to the user instruction. Alternatively, the master electronic device may determine not to switch directly.

If the display screen of any electronic device is a touch screen, for example, the first display screen of the first electronic device in FIG. 2A is the touch screen, the first electronic device may respond to user operation directly if the user operates on the first display screen by finger or other operator. For example, if the user draws a circle on the first display screen by finger, the first electronic device may respond to the operation, and may display a circle at the corresponding location of the first display screen directly. If the second display screen of the second electronic device in FIG. 2A is the touch screen, the second electronic device may respond to user operation directly if the user operates on the second display screen by finger or other operator. Alternatively, the second electronic device may transmit a message to the first electronic device after receiving the operation, the first electronic device responds to the operation and transmits the response to the second electronic device. For example, if the user draws a circle on the second display screen by finger, the second electronic device may respond to the operation, and may display a circle at the corresponding location of the second display screen directly. Alternatively, the second electronic device may transmit information indicating that such user operation is done to the first electronic device by message or instruction. The first electronic device may operate according to the received message or instruction, determine a first content (i.e. a circle), and transmit the first content to the second electronic device to cause the second display screen to display. Alternatively, the first electronic device may instruct the second electronic device to perform the corresponding operation, generate and display the first content.

If the first display screen and the second display screen are touch screens, when the second display screen receives the first operation, it responds to the first operation to generate a response result. The master electronic device performs the corresponding operation according to the response result.

For example, when multiple electronic devices are spliced, the user selects an object on one of the electronic devices and operates on the object. For example, when the object is an image displayed on the second display screen of the second electronic device, the user performs a zoom-in operation on the image displayed on the second display screen, the second electronic device responds to the zoom-in operation to zoom-in the object. When the user continues to zoom-in the image to the extent that the display area of the image has extended to the effective display region of other electronic devices, the other electronic devices respond to the zoom-in operation to generate response results. The individual electronic devices transmit their response results to the master electronic device. The master electronic device transmits information to be displayed on the individual electronic devices to the electronic devices, respectively, for displaying on the display screens of the electronic devices, so that the zoomed in image is displayed on multiple display screens. Alternatively, the master electronic device may transmit instructions to the slave electronic devices respectively after receiving the individual response results, to instruct the individual electronic devices to display the corresponding content. The display screens of the individual electronic devices display corresponding content according to the instructions, so that multiple display screens display the zoomed in image.

For example, when multiple electronic devices are spliced, one object is displayed by multiple display screens in common, and the user operates on the object. For example, when the object is an image, the user performs a zoom-out operation on the image. The user may perform the zoom-out operation by finger. The spliced electronic devices are as shown in FIG. 2A as an example. The user's finger may slide across the display screens of three electronic devices, and the electronic devices may respond to the corresponding operation, and transmit the response result to the master electronic device. The master electronic device may determine the display area of the zoomed-out image according to the response result. For example, the zoomed-out image may only need to be displayed on the second display screen of the second electronic device, so the master electronic device transmits the information to be displayed on the second electronic device to the second electronic device, for displaying on the second display screen of the second electronic device, so that the second display screen of the second electronic device displays the zoomed-out image. Alternatively, the master electronic device may determine the display area of the zoomed-out image after receiving the response result. For example, the zoomed-out image may only need to be displayed on the second display screen of the second electronic device, so the master electronic device transmits the instruction to the second electronic device, to instruct the second electronic device to display the corresponding content, so that the second display screen of the second electronic device displays the corresponding content according to the instruction.

For example, when multiple electronic devices are spliced, the user specifies an object on one electronic device, he/she may move it to another electronic device for display it on the other electronic device. For example, if the display screens of the electronic devices are all touch screens, the user may slide on the spliced screens using his/her finger after specifying an object. The system will synchronize the specified object automatically between the electronic device to the other electronic device.

Taking FIG. 2A as an example, the first display screen of the first electronic device, the second display screen of the second electronic device and the third display screen of the third electronic device are all touch screens.

For example, the user specifies a file on the second display screen of the second electronic device, for example a word file. Then, he/she may drag the file to the third display screen of the third electronic device. In the dragging process, the finger slides across the first display screen of the first electronic device. The system will synchronize the file to the third electronic device, and the third electronic device will obtain the file.

The detailed synchronizing process is as follows.

All the electronic devices records the path where the finger slides across the display screen respectively, for example in such a way that one time point corresponds to one coordinate point;

All the slave electronic devices may transmit the information on the path where the finger slides across their display screens respectively to the master electronic device.

The master electronic device may know the origin electronic device and the destination electronic device of the data according to the path where the finger slides across the display screens. For example, in the embodiment of the present disclosure, the origin electronic device is the second electronic device, and the destination electronic device is the third electronic device.

The origin electronic device may synchronize its mobile data to the master electronic device. For example, in the embodiment of the present disclosure, the second electronic device may transmit the word file to the first electronic device.

The master electronic device synchronizes the data required to be transferred to the destination electronic device. For example, in the embodiment of the present disclosure, the first electronic device may transmit the word file to the third electronic device.

In this way, the whole file may be transferred to another electronic device. Alternatively, a part of the file may be moved to another electronic device. For example, the user specifies a paragraph of the first file being displayed in the first electronic device. The first file may be a first word file. The user may slide to move it to the second electronic device. The second electronic device is displaying a second file which may be a second word file. The user may arrange the specified words in the first file to any location of the second word file directly.

In the following, the method for determining display region in the embodiment of the present disclosure will be described by way of several embodiments in detail.

Embodiment 1

In the embodiment of the present disclosure, a first electronic device, a second electronic device and a third electronic device are spliced together. The first electronic device is the master electronic device, and the second electronic device as well as the third electronic device are slave electronic devices. Each slave electronic device may be connected to the master electronic device in wire or wirelessly. The first electronic device, the second electronic device and the third electronic device may be mobile phones.

The first electronic device transmits a request message to the second electronic device and the third electronic device, to request location relationship information of the second electronic device and the third electronic device with respect to the master electronic device, respectively.

After the first electronic device obtains the location relationship information of the second electronic device and the third electronic device with respect to the master electronic device, respectively, it may continue to transmit size request message to the second electronic device and the third electronic device, to obtain the second size of the second display screen of the second electronic device and the third size of the third display screen of the third electronic device.

The first electronic device determines a display region consisted of the first display screen of the first electronic device, the second display screen of the second electronic device and the third display screen of the third electronic device, based on the location relationship information, the first size of the first display screen itself, the second size of the second display screen and the third size of the third display screen.

The first electronic device determines a first effective display region of the first display screen and a second effective display region of the second display screen, based on a predetermined condition. In the embodiment of the present disclosure, the predetermined condition may be to determine the longest side and the widest side of the display region, and to determine a regular shape according to the longest side or the widest side. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device. The first effective side and the fourth effective side are both long sides, and the first effective side may be determined as the longest side of the display region. The second effective side and the third effective side are both wide sides, and the second effective side may be determined as the widest side of the display region.

In the embodiment of the present disclosure, if the first effective side is determined as the effective long side of the effective display region, the third effective side may be determined as the effective wide side of the effective display region, and the effective display region may be referred to as the third effective display region. If the fourth effective side is determined as the effective long side of the effective display region, the second effective side may be determined as the effective wide side of the effective display region, and the effective display region may be referred to as the fourth effective display region. If the second effective side is determined as the effective wide side of the effective display region, the fourth effective side may be determined as the effective long side of the effective display region, and the effective display region may be referred to as the fifth effective display region. No matter the effective display region is the third effective display region, the fourth effective display region or the fifth effective display region, it is formed of the first effective display region and the second effective display region.

No matter how the electronic devices are arranged, the master electronic device may know the location relationship between the electronic devices and itself, and determine the effective display region without additional controllers. Moreover, multiple display modes may be determined.

Embodiment 2

In the embodiment of the present disclosure, a first electronic device, a second electronic device and a third electronic device are spliced together. The first electronic device is the master electronic device, and the second electronic device as well as the third electronic device are slave electronic devices. Each slave electronic device may be connected to the master electronic device in wire or wirelessly. The first electronic device, the second electronic device and the third electronic device may be mobile phones.

The second electronic device and the third electronic device transmit a message to the first electronic device, respectively, to inform the first electronic device of the location relationship information of the second electronic device and the third electronic device with respect to the master electronic device.

In the message transmitted from the second electronic device and the third electronic device to the first electronic device, in addition to their location information, the size of their display screen may also be included, so that the first electronic device knows the second size of the second display screen of the second electronic device and the third size of the third display screen of the third electronic device. The first electronic device may obtain the first size of the first display screen itself directly.

The first electronic device determines a display region consisted of the first display screen of the first electronic device, the second display screen of the second electronic device and the third display screen of the third electronic device, based on the location relationship information, the first size of the first display screen itself, the second size of the second display screen and the third size of the third display screen.

The first electronic device determines a first effective display region of the first display screen and a second effective display region of the second display screen, based on a predetermined condition. In the embodiment of the present disclosure, the predetermined condition may be to determine the longest side and the widest side of the display region, and to determine a regular shape according to the longest side or the widest side. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device. The first effective side and the fourth effective side are both long sides, and the first effective side may be determined as the longest side of the display region. The second effective side and the third effective side are both wide sides, and the second effective side may be determined as the widest side of the display region.

In the embodiment of the present disclosure, if the first effective side is determined as the effective long side of the effective display region, the third effective side may be determined as the effective wide side of the effective display region, and the effective display region may be referred to as the third effective display region. If the fourth effective side is determined as the effective long side of the effective display region, the second effective side may be determined as the effective wide side of the effective display region, and the effective display region may be referred to as the fourth effective display region. No matter the effective display region is the third effective display region or the fourth effective display region, it is formed of the first effective display region and the second effective display region.

Embodiment 3

In the embodiment of the present disclosure, a first electronic device, a second electronic device and a third electronic device are spliced together. The first electronic device is the master electronic device, and the second electronic device as well as the third electronic device are slave electronic devices. Each slave electronic device may be connected to the master electronic device in wire or wirelessly. The first electronic device, the second electronic device and the third electronic device may be mobile phones.

The First Phase:

The second electronic device and the third electronic device transmit a message to the first electronic device, respectively, to inform the first electronic device of the location relationship information of the second electronic device and the third electronic device with respect to the master electronic device.

In the message transmitted from the second electronic device and the third electronic device to the first electronic device, in addition to their location information, the size of their display screen may also be included, so that the first electronic device knows the second size of the second display screen of the second electronic device and the third size of the third display screen of the third electronic device. The first electronic device may obtain the first size of the first display screen itself directly.

The first electronic device determines a display region consisted of the first display screen of the first electronic device, the second display screen of the second electronic device and the third display screen of the third electronic device, based on the location relationship information, the first size of the first display screen itself, the second size of the second display screen and the third size of the third display screen.

The first electronic device determines a first effective display region of the first display screen and a second effective display region of the second display screen, based on a predetermined condition. In the embodiment of the present disclosure, the predetermined condition may be to determine the longest side and the widest side of the display region, and to determine a regular shape according to the longest side or the widest side. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device. The first effective side and the fourth effective side are both long sides, and the first effective side may be determined as the longest side of the display region. The second effective side and the third effective side are both wide sides, and the second effective side may be determined as the widest side of the display region.

In the embodiment of the present disclosure, if the first effective side is determined as the effective long side of the effective display region, the third effective side may be determined as the effective wide side of the effective display region, and the effective display region may be referred to as the third effective display region. If the fourth effective side is determined as the effective long side of the effective display region, the second effective side may be determined as the effective wide side of the effective display region, and the effective display region may be referred to as the fourth effective display region. No matter the effective display region is the third effective display region or the fourth effective display region, it is formed of the first effective display region and the second effective display region.

Figure 4A:
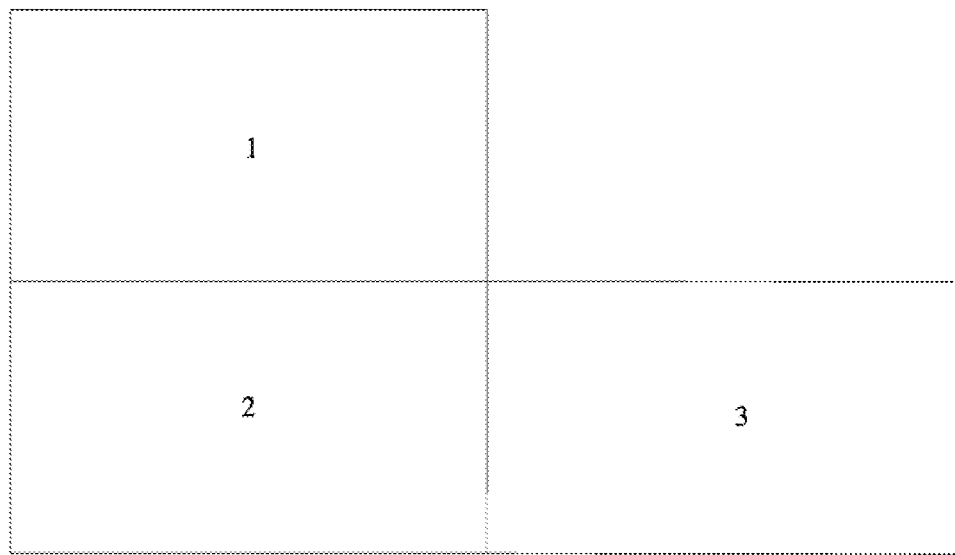
FIG. 4A is schematic diagram of another way of splicing of three electronic devices in the embodiment of the present disclosure.

The Second Phase:

The location of the third electronic device changes to the location as shown in FIG. 4A. Then, the third electronic device may transmit the location relationship information after change to the first electronic device.

The first electronic device determines a display region according to the location relationship information after change, the first size of the first display screen itself, and the second size of the second display screen. The display region is formed of the first display screen and/or the second display screen of the second electronic device and/or the third display screen of the third electronic device.

The first electronic device determines a first effective display region of the first display screen and a second effective display region of the second display screen, based on a predetermined condition. In the embodiment of the present disclosure, the predetermined condition may be to determine the longest side and the widest side of the display region, and to determine a regular shape according to the longest side or the widest side. In the embodiment of the present disclosure, at least one effective long side and at least effective wide side of the display region may be determined according to the first size and the second size. For example, as shown in FIG. 4A, the fifth effective side may be determined according to the long side of the second electronic device and the long side of the third electronic device. The sixth effective side may be determined according to the wide side of the first electronic device and the wide side of the second electronic device. The seventh effective side may be determined according to the wide side of the third electronic device. The eighth effective side may be determined according to the long side of the first electronic device or the long side of the second electronic device. The fifth effective side and the eighth effective side are both long sides, and the fifth effective side may be determined as the longest side of the display region. The sixth effective side and the seventh effective side are both wide sides, and the sixth effective side may be determined as the widest side of the display region.

Figure 4B:
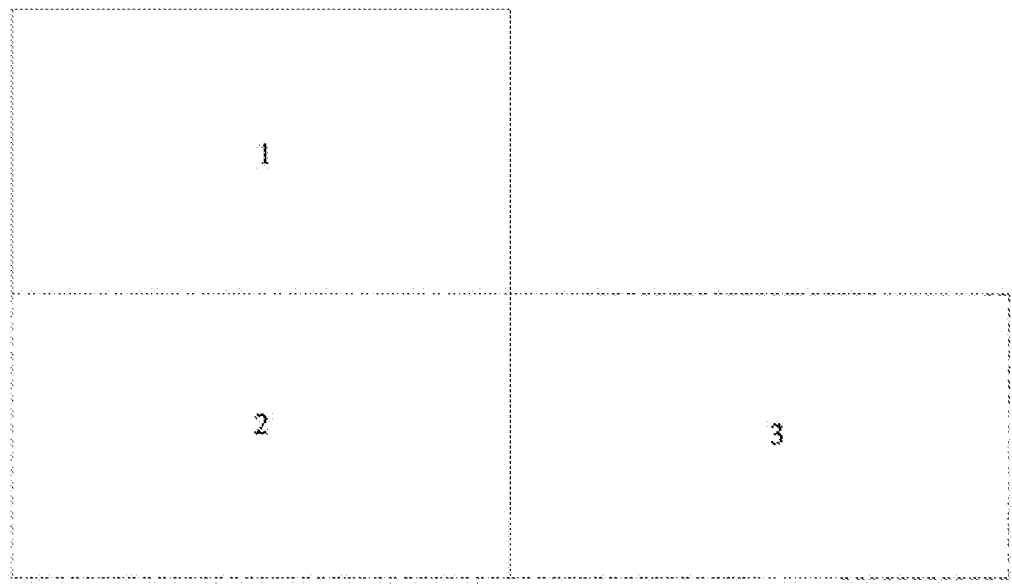
FIG. 4B is a schematic diagram of the effective display region of another way of splicing of three electronic devices in the embodiment of the present disclosure.
Figure 4C:
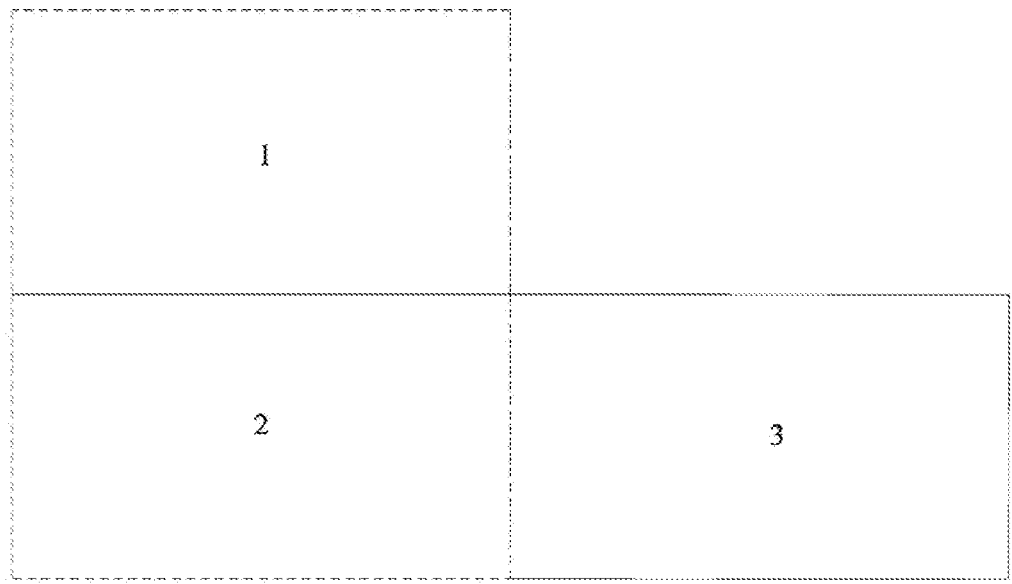
FIG. 4C is a schematic diagram of another effective display region of another way of splicing of three electronic devices in the embodiment of the present disclosure.

In the embodiment of the present disclosure, if the fifth effective side is determined as the long side of the effective display region, the seventh effective side may be determined as the wide side of the effective display region, and the effective display region may be referred to as the sixth effective display region. As shown in FIG. 4B, the section surrounded with the dotted lines is referred to as the sixth effective display region. If the sixth effective side is determined as the wide side of the effective display region, the eighth effective side may be determined as the long side of the effective display region, and the effective display region may be referred to as the seventh effective display region. As shown in FIG. 4C, the section surrounded with the dotted lines is referred to as the seventh effective display region.

When any one electronic device changes its location, the master electronic device may know the change information in time, and re-determine the effective display region according to the changed location relationship among the electronic devices and the size information of the display screens, so that the spliced system may respond to the location change in time.

Embodiment 4

In the embodiment of the present disclosure, a first electronic device, a second electronic device and a third electronic device are spliced together. The first electronic device is the master electronic device, and the second electronic device as well as the third electronic device are slave electronic devices. Each slave electronic device may be connected to the master electronic device in wire or wirelessly. The first electronic device, the second electronic device and the third electronic device may be mobile phones.

The First Phase:

The first electronic device transmits a request message to the second electronic device and the third electronic device, to request location relationship information of the second electronic device and the third electronic device with respect to the master electronic device, respectively.

After the first electronic device obtains the location relationship information of the second electronic device and the third electronic device with respect to the master electronic device, respectively, it may continue to transmit a size request message to the second electronic device and the third electronic device, to obtain the second size of the second display screen of the second electronic device and the third size of the third display screen of the third electronic device.

The first electronic device determines a display region consisted of the first display screen of the first electronic device, the second display screen of the second electronic device and the third display screen of the third electronic device, based on the location relationship information, the first size of the first display screen itself, the second size of the second display screen and the third size of the third display screen.

The first electronic device determines a first effective display region of the first display screen and a second effective display region of the second display screen, based on a predetermined condition. In the embodiment of the present disclosure, the predetermined condition may be to determine at least one effective long side and at least one effective wide side of the display region according to the first size and the second size. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device.

In the embodiment of the present disclosure, if the first effective side is determined as the effective long side of the effective display region, the third effective side may be determined as the effective wide side of the effective display region, and the effective display region may be referred to as the third effective display region. If the fourth effective side is determined as the effective long side of the effective display region, the second effective side may be determined as the effective wide side of the effective display region, and the effective display region may be referred to as the fourth effective display region. No matter the effective display region is the third effective display region or the fourth effective display region, it is formed of the first effective display region and the second effective display region.

The Second Phase:

The current display mode of the first electronic device by default is the second display mode corresponding to the fourth effective display region. The information to be displayed is a video suitable to be displayed in a traverse way, so as to achieve a better display effect. The first electronic device may determine to switch according to the information to be displayed.

The first electronic device judges whether there is at least one other display mode than the current display mode, and determines that there is the first display mode corresponding to the third effective display region than the current display mode. The first electronic device may judge whether it is more suitable for the display of the information than the current display mode, according to the effective display region corresponding to the first display mode. The first electronic device determines that the first display mode is more suitable for the display of the information than the current second display mode, and may control to switch the display mode from the current second display mode to the first display mode.

When there are multiple display modes, the display mode can be determined according to the user instruction, and can be selected by the master electronic device according to the property of the information to be displayed automatically. Also, the display mode may be switched among the various display modes. It is convenient and flexible, and the display quality is improved.

Embodiment 5

In the embodiment of the present disclosure, a first electronic device, a second electronic device and a third electronic device are spliced together. The first electronic device is the master electronic device, and the second electronic device as well as the third electronic device are slave electronic devices. Each slave electronic device may be connected to the master electronic device in wire or wirelessly. The first electronic device, the second electronic device and the third electronic device may be mobile phones.

The First Phase:

The first electronic device transmits a request message to the second electronic device and the third electronic device, to request location relationship information of the second electronic device and the third electronic device with respect to the master electronic device, respectively.

After the first electronic device obtains the location relationship information of the second electronic device and the third electronic device with respect to the master electronic device, respectively, it may continue to transmit a size request message to the second electronic device and the third electronic device, to obtain the second size of the second display screen of the second electronic device and the third size of the third display screen of the third electronic device.

The first electronic device determines a display region consisted of the first display screen of the first electronic device, the second display screen of the second electronic device and the third display screen of the third electronic device, based on the location relationship information, the first size of the first display screen itself, the second size of the second display screen and the third size of the third display screen.

The first electronic device determines a first effective display region of the first display screen and a second effective display region of the second display screen, based on a predetermined condition. In the embodiment of the present disclosure, the predetermined condition may be to determine the longest side and the widest side of the display region, and to determine a regular shape according to the longest side or the widest side. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device. The first effective side and the fourth effective side are both long sides, and the first effective side may be determined as the longest side of the display region. The second effective side and the third effective side are both wide sides, and the second effective side may be determined as the widest side of the display region.

In the embodiment of the present disclosure, if the first effective side is determined as the effective long side of the effective display region, the third effective side may be determined as the effective wide side of the effective display region, and the effective display region may be referred to as the third effective display region. If the fourth effective side is determined as the effective long side of the effective display region, the second effective side may be determined as the effective wide side of the effective display region, and the effective display region may be referred to as the fourth effective display region. No matter the effective display region is the third effective display region or the fourth effective display region, it is formed of the first effective display region and the second effective display region.

The Second Phase:

The current display mode of the first electronic device by default is the first display mode corresponding to the third effective display region. The information to be displayed is a video suitable to be displayed in a traverse way, so as to achieve a better display effect. The first electronic device may determine to switch according to the information to be displayed.

The first electronic device judges whether there is at least one other display mode than the current display mode, and determines that there is the second display mode corresponding to the fourth effective display region than the current display mode. The first electronic device may judge whether it is more suitable for the display of the information than the current display mode, according to the effective display region corresponding to the second display mode. The first electronic device determines that the current first display mode is already more suitable for the display of the information than the second display mode, and may control not to switch the display mode. Alternatively, if the user instructs the first electronic device to switch, the first electronic device may switch according to the user instruction.

Embodiment 6

In the embodiment of the present disclosure, a first electronic device, a second electronic device and a third electronic device are spliced together. The first electronic device is the master electronic device, and the second electronic device as well as the third electronic device are slave electronic devices. Each slave electronic device may be connected to the master electronic device in wire or wirelessly. The first electronic device, the second electronic device and the third electronic device may be mobile phones.

The First Phase:

The first electronic device transmits a request message to the second electronic device and the third electronic device, to request location relationship information of the second electronic device and the third electronic device with respect to the master electronic device, respectively.

After the first electronic device obtains the location relationship information of the second electronic device and the third electronic device with respect to the master electronic device, respectively, it may continue to transmit size request message to the second electronic device and the third electronic device, to obtain the second size of the second display screen of the second electronic device and the third size of the third display screen of the third electronic device.

The first electronic device determines a display region consisted of the first display screen of the first electronic device, the second display screen of the second electronic device and the third display screen of the third electronic device, based on the location relationship information, the first size of the first display screen itself, the second size of the second display screen and the third size of the third display screen.

The first electronic device determines a first effective display region of the first display screen and a second effective display region of the second display screen, based on a predetermined condition. In the embodiment of the present disclosure, the predetermined condition may be to determine the longest side and the widest side of the display region, and to determine a regular shape according to the longest side or the widest side. For example, for the three electronic devices as shown in FIG. 2A, the first effective side may be determined according to the long side of the first electronic device and the wide side of the third electronic device. The second effective side may be determined according to the wide side of the first electronic device and the wide side of the second electronic device. The third effective side may be determined according to the long side of the third electronic device. The fourth effective side may be determined according to the long side of the first electronic device or the long side of the second electronic device. The first effective side and the fourth effective side are both long sides, and the first effective side may be determined as the longest side of the display region. The second effective side and the third effective side are both wide sides, and the second effective side may be determined as the widest side of the display region.

In the embodiment of the present disclosure, if the first effective side is determined as the effective long side of the effective display region, the third effective side may be determined as the effective wide side of the effective display region, and the effective display region may be referred to as the third effective display region. If the fourth effective side is determined as the effective long side of the effective display region, the second effective side may be determined as the effective wide side of the effective display region, and the effective display region may be referred to as the fourth effective display region. No matter the effective display region is the third effective display region or the fourth effective display region, it is formed of the first effective display region and the second effective display region.

The Second Phase:

The first display screen and the second display screen are both touch screens. There is a word file on the second electronic device. The user drags the file from the second electronic device to the third electronic device, and not goes across the first electronic device. The second electronic device and the third electronic device record the information on the path where the finger slides across the display screen respectively, and transmit the record to the first electronic device. The first electronic device determines the second electronic device as the origin electronic device, and the third electronic device as the destination electronic device according to the received records. The first electronic device transmits the file in the second electronic device to the third electronic device. In particular, the second electronic device may transmit the file to the first electronic device firstly, and then the first electronic device transmits the file to the third electronic device. Alternatively, the first electronic device may transmit an instruction to the second electronic device, to instruct the second electronic device to transmit the file to the third electronic device.

The information in one electronic device may be moved to another electronic device directly, and it is very convenient to conduct such operation.

Figure 5:
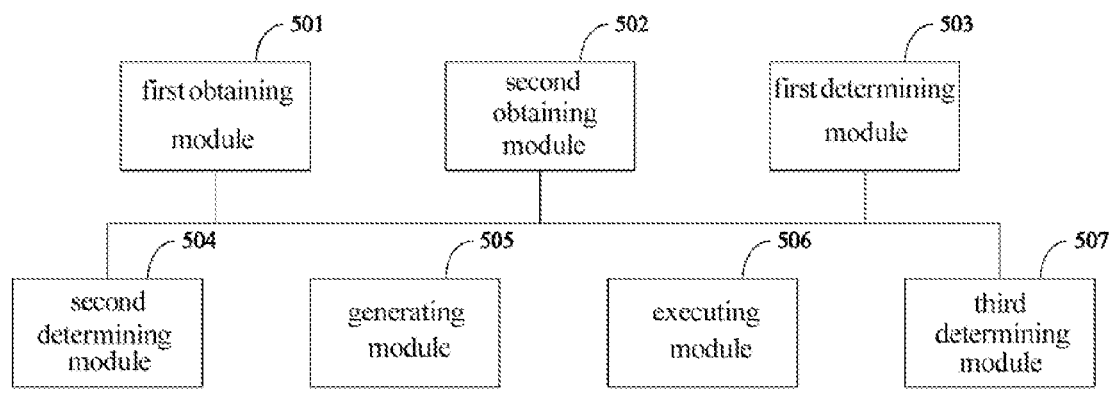
FIG. 5 is a detailed structural diagram of an electronic device in an embodiment of the present disclosure.

Referring to FIG. 5, an electronic device is provided in the present disclosure, which may comprise a first display screen when using as a master electronic device. The master electronic device is connectable to at least one slave electronic device. Each slave electronic device of the at least one slave electronic device may comprise a second display screen. The master electronic device may comprise a first obtaining module 501, a second obtaining module 502, a first determining module 503 and a second determining module 504.

The first obtaining module 501 is used to obtain location relationship information of each slave electronic device of the at least one slave electronic device with respect to the master electronic device, when connecting with the at least one slave electronic device.

The first obtaining module 501 is also used to re-obtain the location relationship information of each slave electronic device of the at least one slave electronic device with respect to the master electronic device, based on the detection of a location change of any electronic device.

The first obtaining module 501 is also used to obtain location relationship information with respect to each slave electronic device of the at least one slave electronic device, based on the detection of the location of the at least one slave electronic device; or receive location information transmitted by each slave electronic device of the at least one slave electronic device, and obtain location relationship information with respect to each slave electronic device of the at least one slave electronic device.

The second obtaining module 502 is used to obtain a first size of the first display screen of the master electronic device, and a second size of the second display screen of each slave electronic device of the at least one slave electronic device.

The second obtaining module 502 is used for obtaining the second size of the second display screen of each slave electronic device of the at least one slave electronic device, based on size information transmitted by each slave electronic device of the at least one slave electronic device; or obtaining the second size of the second display screen of each slave electronic device of the at least one slave electronic device, based on a set coordinate system.

The first determining module 503 is used to determine a display region consisted of the first display screen of the first size and the second display screen of the second size, based on the location relationship information, the first size and the second size.

The first determining module 503 is also used to determine a display region consisted of the first display screen of the first size and the second display screen of the second size, based on the re-obtained location relationship information, the first size and the second size.

The second determining module 504 is used to determine a first effective display region of the first display screen and a second effective display region of the second display screen, based on a predetermined condition, wherein the first effective display region and the second effective display region form the effective display region within the display screen.

The electronic device in FIG. 5 may also comprise a generating module 505, an executing module 506 and a third determining module 507.

The generating module 505 is used to respond to a first operation to generate a response result, when the first display screen is a touch screen and the first display screen receives the first operation.

The executing module 506 is used to perform a corresponding operation according to the response result.

if the electronic device is a slave electronic device, when the second display screen is a touch screen and the second display screen receives the first operation, the at least one slave electronic device responds to the first operation to generate a response result, and the executing module 506 is used to perform a corresponding operation according to the response result.

The third determining module 507 is used to determine objects to be displayed in the first display screen and the second display screen respectively according to the effective display region, and instruct the first display screen and the second display screen to display the objects determined to be displayed respectively.

Figure 6:
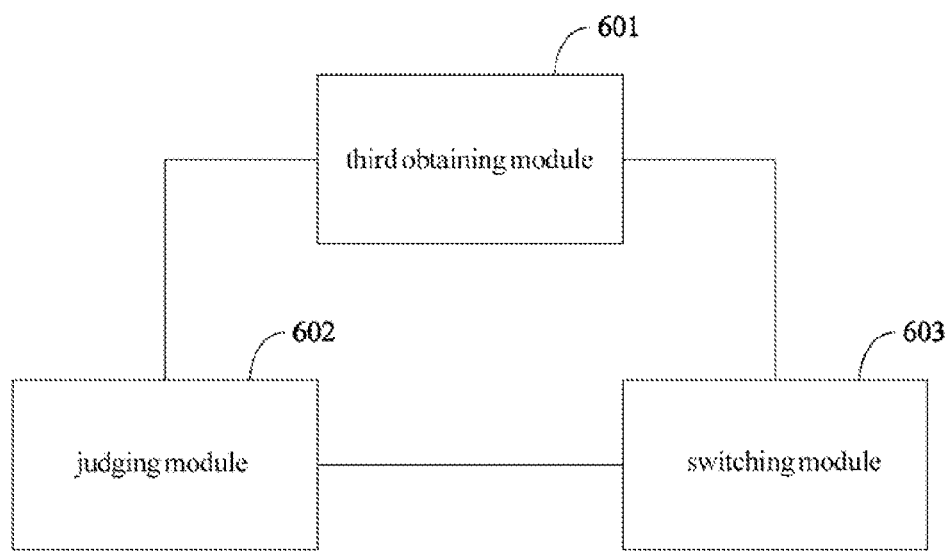
FIG. 6 is a main structural diagram of another electronic device in the embodiment of the present disclosure.

Referring to FIG. 6, an electronic device is also provided in the present disclosure, which may comprise a first display screen when using as a master electronic device. The master electronic device is connectable to at least one slave electronic device. Each slave electronic device of the at least one slave electronic device may comprise a second display screen. The master electronic device may comprise: a third obtaining module 601, a judging module 602 and a switching module 603.

The third obtaining module 601 is used for obtaining information to be displayed when the display mode is to be switched.

The judging module 602 is used for judging whether there is at least one other display mode than current display mode, when connecting with at least one slave electronic device.

The switching module 603 is used for switching to one display mode of the other display mode when the judging result is positive.

In the method for determining display region in the present disclosure, the location relationship information of each slave electronic device of the at least one slave electronic device with respect to the master electronic device is obtained, when connecting with the at least one slave electronic device. The first size of the first display screen of the master electronic device, and the second size of the second display screen of each slave electronic device of the at least one slave electronic device are obtained. The display region consisted of the first display screen of the first size and the second display screen of the second size is determined, based on the location relationship information, the first size and the second size. The first effective display region of the first display screen and the second effective display region of the second display screen are determined based on a predetermined condition, wherein the first effective display region and the second effective display region form an effective display region within the display screen. When there are multiple electronic devices for slicing, at least one effective display region can be determined based on different sizes of different display screens of different electronic devices to display the display objects, so that the effective display region can be determined according to the splicing location of the multiple electronic devices in real-time, the display quality is improved, and the display effect is improved.

In the following, an information processing method according to the embodiment of the present disclosure will be described with reference to FIG. 7.

The information processing method according to the embodiment of the present disclosure is applied to an electronic device. The electronic device is such as a mobile terminal, a tablet, etc. The electronic device comprises a touch sensitive module for sensing the user's touch input. Moreover, the electronic device also comprises a display module for display image to user. Optionally, the touch sensitive module and the display module are arranged by lamination, to form a touch display module (which is also referred to as a touch display screen hereinafter).

The electronic device may be in one of two work modes. The two work modes are the stand-alone mode and the link mode respectively. In the stand-alone mode, the electronic device operates separately, just as that in the prior art. In the link mode, the electronic device, as a master electronic device, is coupled to one or more other electronic devices as the slave electronic devices, to form a display system. The other electronic devices and the electronic device may be of a same kind, for example, are all mobile terminals. The other electronic devices and the electronic device may be of different kinds. For example, the electronic device is a tablet, and the other electronic devices are mobile terminals. Moreover, the link mode may be further divided into a lock mode in the link state and a unlock mode in the link state. The stand-alone mode may be further divided into a lock mode in the stand-alone state and a unlock mode in the stand-alone state.

In the following description, in the unlock scenario, for example, the lock mode in the link state is referred to as the first work mode, and the lock mode in the stand-alone state is referred to as the second work mode. Those skilled in the art can understand that, in the lock scenario, the unlock mode in the link state may be the first work mode described later, and the unlock mode in the stand-alone state may be the second work mode described later.

Figure 7:
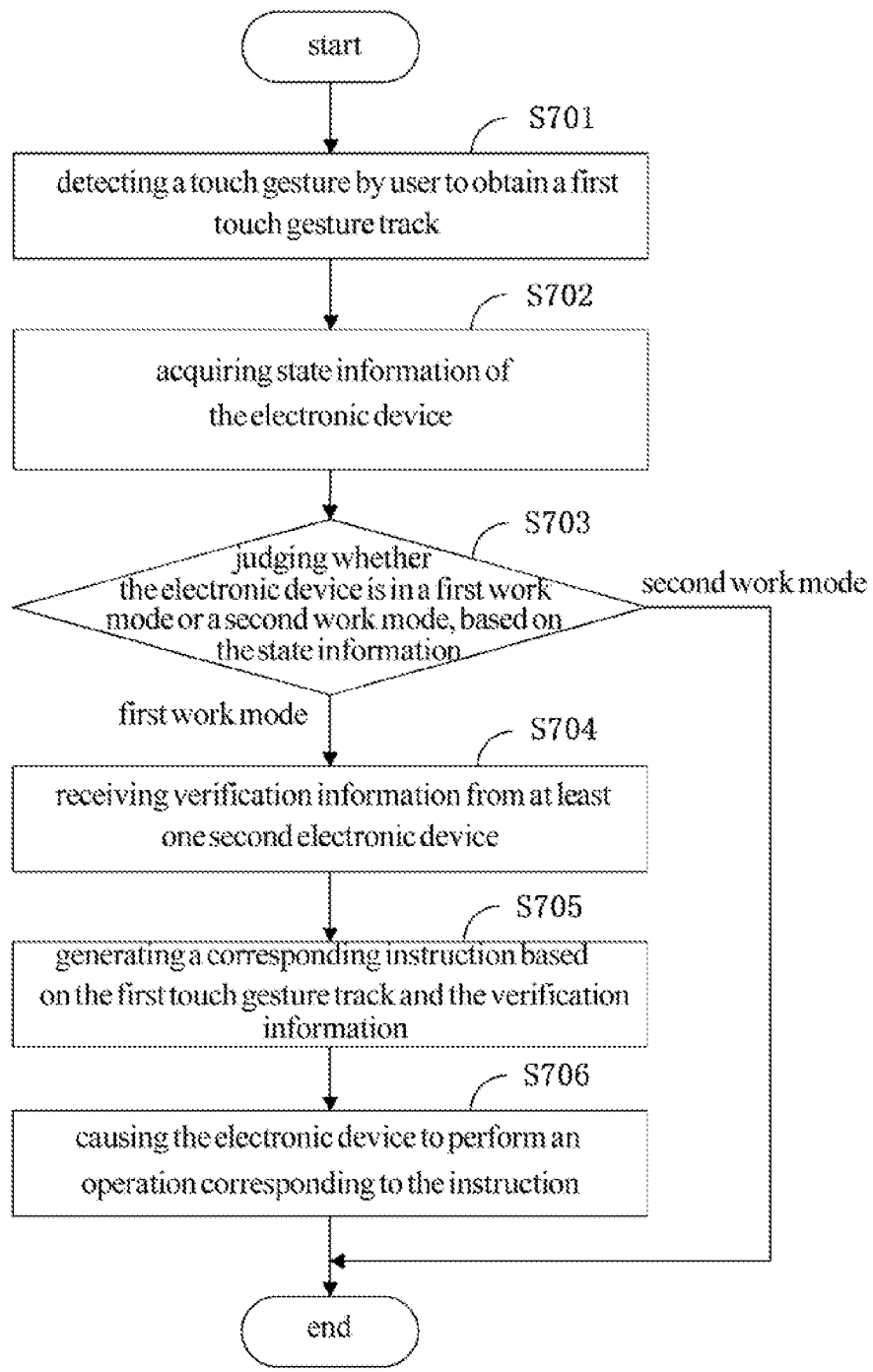
FIG. 7 is a flowchart of an information processing method according to an embodiment of the present disclosure.

As shown in FIG. 7, first, at step S701, the information processing method detects a touch gesture by user to obtain a first touch gesture track. In particular, the information processing method detects the user's touch gesture by the touch sensitive module for example. The detailed process is known to those skilled in the art, and will not be described here in detail.

On the other hand, at step S702, the information processing method acquires state information of the electronic device. In particular, the state information is for example the connection information of the electronic device to other electronic devices. In particular, when the electronic device is connected to the other electronic device in wire or wirelessly, the information processing method senses the connection through the connection pin or the wireless port, so as to acquire the state information of the electronic device. At this time, the information processing method may also set a flag indicating the connection state of the electronic device itself to the external device, for example to "1". Of course, in the case where the electronic device has already been connected to the other electronic device in wire or wirelessly and performed the setting operation, the information processing method may obtain the state information of the electronic device by reading the connection flag directly.

Next, at step S703, the information processing method judges whether the electronic device is in the first work mode or the second work mode, based on the state information. For example, in the above case, the information processing method reads out the value of the connection flag. When the value of the connection flag is "1", the information processing method determines that the electronic device is in the first work mode. When the value of the connection flag is "0", the information processing method determines that the electronic device is in the second work mode. Alternatively, in the case where the information processing method reads out the level of the connection pin as the state information, when the level is above a predetermined threshold, the information processing method determines that the electronic device is in the first work mode. When the level is below the predetermined threshold, the information processing method determines that the electronic device is in the second work mode.

Then, when it is judged that the electronic device is in the second work mode, the information processing method according to the embodiment of the present disclosure ends.

On the other hand, when it is judged that the electronic device is in the first work mode, the information processing method goes to step S704. At step S704, the information processing method receives verification information from at least one second electronic device.

The at least one second electronic device is the electronic device that forms the display system with the above electronic device. The process of forming the display system by the second electronic device and the electronic device will be described later in detail. The verification information may be a verification result provided from the second electronic device to the electronic device. Alternatively, it may be information for verification provided from the second electronic device to the electronic device. The verification information will be described later in combination with three detail examples.

After receiving the verification information, at step S705, the information processing method generates a corresponding instruction based on the first touch gesture track and the verification information, and causes the electronic device to perform an operation corresponding to the instruction at step S706.

The information processing method according to the embodiment of the present disclosure has been described above.

In the information processing method of the embodiment of the present disclosure, the electronic device can operate in at least two work modes of the stand-alone mode and the link mode. When the electronic device is judged to be in the link mode, the information processing method generates corresponding instruction based on the detected user's touch gesture and the verification information from at least one other electronic device, and performs the operation corresponding to the instruction, so as to perform different processes based on the work mode of the electronic device.

It is to be noted that the processing order of steps S701-S706 is just an example. Those skilled in the art can understand that, the information processing method according to the embodiment of the present disclosure can be realized in an order different from that shown in FIG. 7. For example, the process of step S701 may be performed with steps S702-S703 in a reverse or parallel order.

Hereinafter, the information processing method according to the embodiment of the present disclosure will be described in detail in combination with three detail examples.

In the first example, assume that the electronic device and the second electronic device form the display system, and the information processing method according to the embodiment of the present disclosure is applied to a scenario where (the screen of) the display system is to be unlocked. In this example, the verification information is the second touch gesture track detected by the second electronic device. Thereby, at step S705, the information processing method verifies whether the first touch gesture track matches with a first preset track to obtain a first match result. Also, the information processing method verifies whether the second touch gesture track matches with a second preset track to obtain a second match result. The first preset track and the second preset track are stored in advance in the electronic device as comparison templates for example. The detailed process of verifying whether the gesture track matches with the preset track by the information processing method is known to those skilled in the art, and will not be described here in detail.

The information processing method generates a first switching instruction as the instruction, when the first match result indicates that the first touch gesture track matches with the first preset track, and the second match result indicates that the second touch gesture track matches with the second preset track. In this case, the first switch instruction is for example the unlock instruction.

In response to the first switch instruction, the information processing method causes the electronic device into the third work mode. It is to be noted that the electronic device performs an instruction in a first instruction set when in a first work mode, performs an instruction in a second instruction set when in a second work mode, and performs an instruction in a third instruction set when in a third work mode. The number of instructions in the first instruction set is less than that in the third instruction set, and the number of instructions in the second instruction set is less than that in the third instruction set. In this example, the third work mode is for example the unlock mode in link state.

That is to say, in this example, in order to unlock the display system, the user needs to perform predetermined gesture on the effective operation region of the electronic device and the second electronic device (i.e., the region forming the display system). The electronic device, as the master electronic device of the display system, detects the first touch gesture track performed on itself by the user and verifies whether it matches with the first preset track on one hand, and on the other hand, receives the second touch gesture performed on the second electronic device by the user, which is transmitted from the second electronic device, and verifies whether it matches with the second preset track. When both of them match, the information processing method generates an unlock instruction and performs the unlock operation, to cause the electronic device into the unlock mode in the link state.

In the second example, also assume that the electronic device and the second electronic device form the display system, and the information processing method according to the embodiment of the present disclosure is applied to a scenario where (the screen of) the display system is to be unlocked. In this example, the verification information is a second match result obtained from the second electronic device by obtaining a second touch gesture track and verifying whether the second touch gesture track matches with a second preset track, and the verification information is transmitted to the electronic device by the second electronic device. Then, at step S705, it is verified whether the first touch gesture track matches with a first preset track to obtain a first match result. A first switching instruction is generated as the instruction, when the first match result indicates that the first touch gesture track matches with the first preset track, and the second match result indicates that the second touch gesture track matches with the second preset track. In this case, the first switch instruction is for example the unlock instruction.

In response to the first switch instruction, the information processing method causes the electronic device into the third work mode described above.

That is to say, in this example, in order to unlock the display system, also, the user needs to perform predetermined gesture on the effective operation region of the electronic device and the second electronic device (i.e., the region forming the display system). Different from that in the above example, the electronic device, as the master electronic device of the display system, only verifies whether the first touch gesture track performed on itself by the user matches with the first preset track, and does not verify whether the second touch gesture matches with the second preset track. Rather, the second electronic device verifies whether the second touch gesture track matches with the second preset track, and transmits the verification result as the verification information to the electronic device. When both of them match, the information processing method generates an unlock instruction and performs the unlock operation, to cause the electronic device into the unlock mode in the link state. Thereby, the electronic device does not need to perform verifications by a number of times which is the same as the number of the electronic devices linked in order to unlock in the link mode, so that the processing efficiency is improved when the processing capability of the electronic device is limited.

In the third example, the same as that in the first example, the verification information is a second touch gesture track detected by the second electronic device. However, different from that in the first example, the electronic device does not verify the first touch gesture track and the second touch gesture track, respectively. Rather, the electronic device, as the master electronic device of the display system, obtains a combining track based on the first touch gesture track and the second touch gesture track firstly. In particular, for example, the information processing method may combine the first touch gesture track and the second touch gesture track in such a way that the electronic device and the second electronic device are spliced. Then, the information processing method verifies whether the combining track matches with a preset combining track to obtain a match result. The information processing method generates a first switching instruction as the instruction, for example a unlock instruction, when the match result indicates that the combining track matches with the preset combining track. Thereby, the electronic device does not need to store preset tracks the number of which is the same as that of the electronic device linked in order to unlock in the link mode, and only needs to store a single combining track, so that the storage capacity is saved.

Then, after the operations in the above three examples, the information processing method may transmit the instruction to the second electronic device, wherein the second electronic device performs an operation corresponding to the instruction. In particular, when the information processing method according to the embodiment of the present disclosure starts, the second electronic device is in the same work mode as the electronic device, for example, in the first work mode. When the unlock instruction is received from the electronic device, the second electronic device goes into the third work mode. Thereby, the electronic device and the second electronic device forming the display system may perform corresponding operations (such as unlocking/locking) at the same time in response to the instruction issued by the electronic device (such as an unlock/lock instruction), to ensure the display consistency and the operation consistency of the display system.

The operations when it is judged that the electronic device is in the first work mode have been described above. Hereinafter, operations when it is judged that the electronic device is in the second work mode (e.g., lock mode in the stand-alone state) will be described. At this time, the information processing method verifies whether the first touch gesture track matches with a third preset track different from the first preset track. The information processing method generates a second switching instruction, when the first touch gesture track matches with the third preset track, and causes the electronic device into a fourth work mode in response to the second switching instruction, wherein, the electronic device performs an instruction in a fourth instruction set when in a fourth work mode, the number of instructions in the first instruction set is less than that in the fourth instruction set, and the number of instructions in the second instruction set is less than that in the fourth instruction set. That is, in this case, the electronic device goes into the unlock mode in the stand-alone state.

In this embodiment, the first touch gesture track needed to be detected by the electronic device itself in the link mode is different from the verification information from the second electronic device. In the stand-alone mode, the information processing method only needs to detect the first touch gesture track by the electronic device itself. Also, the third preset track is different from the first preset track. It means that the electronic device have different unlock/lock tracks (i.e., patterns) in the stand-alone mode and in the link mode.

Moreover, it is to be noted that, in the above embodiment, the unlock/lock instruction is generated based on the first touch gesture track detected by the electronic device itself and the verification information from the second electronic device, when it is judged that the electronic device is in the first work mode. Optionally, when the touch gesture across the effective operation regions of the electronic device and the electronic device is a continuing gesture, the information processing method may further generate the unlock/lock instruction based on the time information of the first touch gesture track and the second touch gesture track.

In particular, the information processing method obtains the first time information of the first touch gesture track detected by itself and the second time information of the second touch gesture track detected by the second electronic device, calculates the difference between the first time indicated by the first time information and the second time indicated by the second time information, judges whether the difference is below a predetermined threshold or not. When the difference is below the predetermined threshold, if the verification in the above example obtains a positive result, the information processing method generates an unlock/lock instruction. On the other hand, if the difference is above the predetermined threshold, even if the verification in the above example obtains a positive result, the information processing method does not generate the unlock/lock instruction.

Here, those skilled in the art can understand that the first time and the second time may be the touch start time of the first touch gesture track and the touch start time of the second touch gesture track respectively, or may be the touch end time of the first touch gesture track and the touch end time of the second touch gesture track respectively, or may be the touch end time of the first touch gesture track (or the second touch gesture track) and the touch start time of the second touch gesture track (or the first touch gesture track) respectively.

In the information processing method of the above embodiment, considering the continuity of the touch gesture across multiple electronic devices, the consistency of the display system is better, and it avoids the case where the user touches the individual electronic devices in multiple different times, and decreases the error operation.

Hereinafter, the process to form the display system by combining multiple electronic devices, i.e., the process of entering into the first work mode by the electronic device as the master electronic device, in the information processing method of the embodiment of the present disclosure will be described with reference to FIGS. 8A and 8B.

It is to be noted that, in the embodiment of the present disclosure, the electronic device as the master electronic device is coupled to one or more electronic devices as the slave electronic device to form a display system. The other electronic devices and the electronic device may be of the same kind, such as a mobile phone. The other electronic devices and the electronic device may be of different kinds. For example, the electronic device is a tablet, and the other electronic device is a mobile phone. The display system may have an effective display region. The effective display region may be formed of a first part of the display region (hereinafter, referred to as the first display region when appropriate for distinguishing) of the master electronic device, and a second part of the display region (hereinafter, referred to as the second display region when appropriate for distinguishing) of the slave electronic device. The master electronic device obtains the information on the image for displaying on the effective display region, determines corresponding partial image for displaying on the individual slave electronic devices, and transmit the information on the partial image to the individual slave electronic devices. The slave electronic device displays the partial image on its partial display region (i.e., the above second part) based on the information on the partial image received from the master electronic device, so that the whole image is displayed on the effective display region of the display system. Alternatively, the master electronic device and the slave electronic device may display their own images separately, so that multiple images irrelated to each other may be displayed on different regions of the effective display region of the whole display system.

Also, it is to be noted that the effective display region may be the effective touch display region when the display module is arranged with the touch sensitive module by lamination.

Figure 8A:
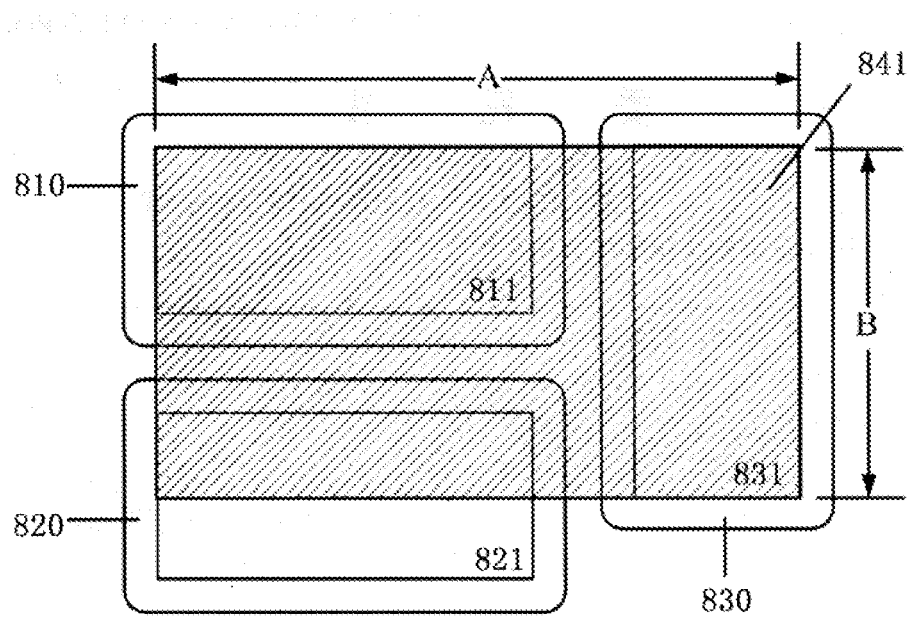
FIG. 8A is a schematic diagram of the processing of forming a display system by combining multiple electronic devices in the information processing method according to the embodiment of the present disclosure.
Figure 8B:
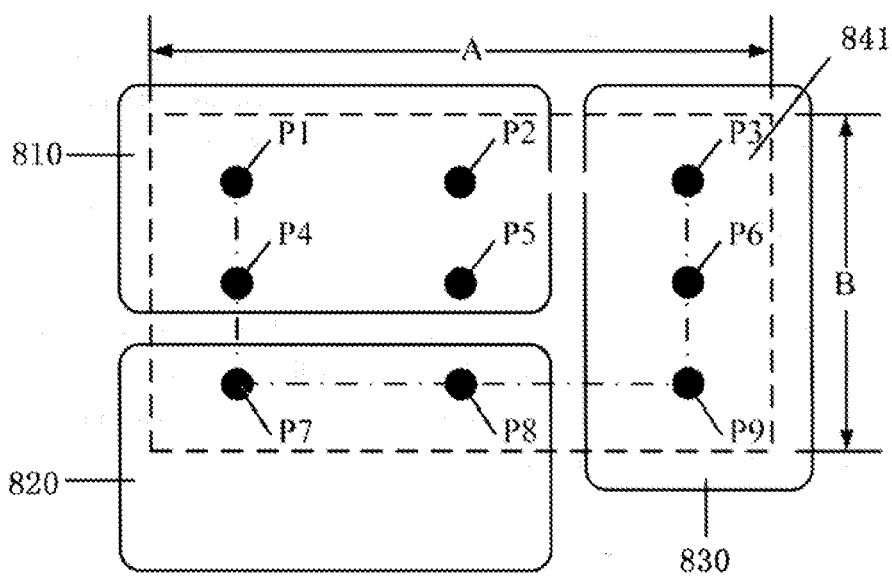
FIG. 8B is a display schematic diagram of the electronic device to which the information processing method according to the embodiment of the present disclosure is applied.

As shown in FIGS. 8A and 8B, the master electronic device 801 comprises a first display screen 811, the slave electronic device 820 comprises a second display screen 821, and the slave electronic device 830 comprises a third display screen 831. According to the embodiment of the present disclosure, when the master electronic device 810 is coupled to the slave electronic devices 820 and 830, the location relationship information of the slave electronic devices 820 and 830 with respect to the master electronic device is obtained. Then, the information processing method obtains the first size information of the first display screen of the master electronic device and the second size information of the second display screen of each slave electronic device.

Then, the information processing method determines a display region according to the obtained location relationship information, the first size information of the first display screen 211 and the second size information of the second display screens 821 and 831. The display region is consisted of the first display screen 811 and the second display screens 821 and 831. Then, the information processing method determines the effective display region of the display region.

As shown in FIG. 8A, when the display region is in a traverse display manner, the effective display region 841 in the display region may be determined, so that the first length A of the effective display region 841 traversely is longer than the length B of the effective display region 841 latitudely, and the first length A is the longest length that the effective display region 841 can achieve traversely when the ratio of the first length to the second length meets a first proportion condition. For example, it can be set in advance that the ratio X of first length to the second length of the effective display region should meet $4:3 \leq X \leq 16:9$ in the traverse display manner, wherein, $X=A:B$.

Then, the first part of the first display screen and the second part of the second display screen constituting the effective display region 841 are determined. In the example shown in FIG. 8A, the whole display region of the first display screen 811 is the first part. The whole display region of the third display screen 831 is the second part. The display region of the second display screen 821 which is contained in the effective display region 841 is the second part. As described above, the slave electronic device 820 may not display on the part of the display region of the second display screen 821 which is not contained in the effective display region 841.

The process when the display region is in a latitude display manner is similar to the above, and is not described here in detail.

Thereby, the method for combining screens of the electronic devices in the information processing method of the embodiment of the present disclosure has been described above. Multiple display screens of multiple electronic devices may be combined to form a relatively large display region conveniently by the master electronic device according to the location information of the electronic devices connected with each other and the size information of the display screen of the electronic device. The display screens of the multiple electronic devices do not need to be combined in a fix way. Rather, the display region may be formed according to the location of the electronic devices connected with each other. Moreover, the screens of multiple electronic devices may be combined without additional image controllers, thereby the product cost is saved.

The information processing method according to the embodiment of the present disclosure determines the effective display region of the master electronic device and the effective display region of the slave electronic device by the processing with reference to FIG. 8A, so that the electronic device is in a first work mode. Then, in the information processing method with reference to FIG. 7, before step S701, the information processing method may further obtain preset image information, for example, an unlock prompt identifier in the unlock scenario. Then, the information processing method determines the corresponding partial image to be displayed on the slave electronic device of the preset image, and transmits the information on the partial image to the slave electronic device. The slave electronic device displays the partial image on its partial display region (i.e., the above second part) based on the information on the partial image received from the master electronic device. Thereby, the information processing method according to the embodiment of the present disclosure may display the whole preset image on the effective display region of the whole display system, to prompt the user to perform the gesture input operation.

FIG. 8B shows the schematic display diagram of the electronic device to which the information processing method according to the embodiment of the present disclosure is applied. In FIG. 8B, the effective (touch) display region of the display system is represented by dotted lines. The boundary lines of the individual display screen of each electronic device in FIG. 8A is omitted here for clarify. It can be seen from FIG. 8B that the preset image, which is an unlock prompt image comprising nine unlock prompt identifiers P1-P9, is displayed on the effective display region by the above process. Assumes that in the information processing method according to the embodiment of the present disclosure, the preset whole unlock track is a track along P1→P4→P7→P8→P9→P6→P3 in order, which is represented in FIG. 8B in dot-slashed lines. Accordingly, the information processing method sets in advance that the first preset track corresponding to the master electronic device 810 is a track of P1→P4, the second preset track corresponding to the slave electronic device 820 is a track of P7→P8, and the third preset track corresponding to the slave electronic device 830 is a track of P9→P6→P3 in the connection mode as shown in FIG. 8B.

In this case, the user's touch gesture is detected by the process of the information processing method with reference to FIG. 7, and the first touch gesture track corresponding to the master electronic device 810, the second touch gesture track corresponding to the slave electronic device 820 and the third touch gesture track corresponding to the slave electronic device 830 are obtained, respectively.

According to the process in the above first example, the master electronic device 810 to which the information processing method is applied verifies whether the first, second and third touch gesture tracks match with the first, second and third preset tracks respectively to obtain the verification results.

According to the process in the above second example, the master electronic device 810 to which the information processing method is applied verifies whether the first touch gesture track matches with the first preset track, and the slave electronic devices 820 and 830 verify whether the second and third touch gesture tracks match with the second and third preset tracks respectively to obtain the verification results, and transmit them to the master electronic device.

According to the process in the above third example, the master electronic device 810 to which the information processing method is applied obtains a combination track based on the first, second and third touch gesture tracks. Then, the information processing method verifies whether the combination track matches with the preset whole unlock track to obtain the verification result.

When a positive verification result is obtained according to either example, the information processing method generates an unlock instruction and unlocks the master electronic device 810, and the slave electronic devices 820 and 830.

The information processing method according to the embodiment of the present disclosure has been described above.

Figure 9:
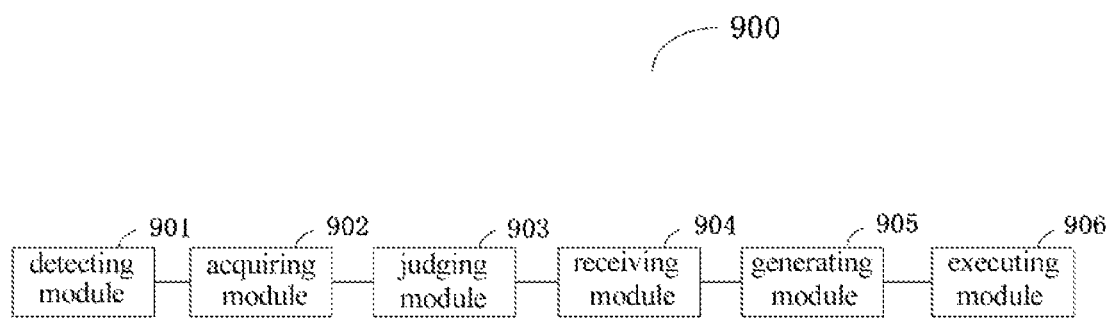
FIG. 9 is a block diagram of main configuration of the electronic device according to an embodiment of the present disclosure.

In the following, the electronic device according to the embodiment of the present disclosure will be described with reference to FIG. 9. The electronic device according to the embodiment of the present disclosure is for example a mobile terminal, a tablet, etc. As shown in FIG. 9, the electronic device 900 of the embodiment of the present disclosure comprises a detecting module 901, an acquiring module 902, a judging module 903, a receiving module 904, a generating module 905 and an executing module 906.

The detecting module 901 is used for detecting a touch gesture by user to obtain a first touch gesture track. The acquiring module 902 is used for acquiring state information of the electronic device. The judging module 903 is used for judging whether the electronic device is in a first work mode or a second work mode, based on the state information. The receiving module 904 is used for receiving verification information from at least one second electronic device, when the electronic device is in the first work mode. The generating module 905 is used for generating a corresponding instruction based on the first touch gesture track and the verification information. The executing module 906 is used for performing an operation corresponding to the instruction.

In one embodiment, the verification information is a second touch gesture track detected by the second electronic device. In this case, the generating module 905 comprises: a first verifying module, a second verifying module and a first instruction generating module (not shown). The first verifying module is used for verifying whether the first touch gesture track matches with a first preset track to obtain a first match result. The second verifying module is used for verifying whether the second touch gesture track matches with a second preset track to obtain a second match result. The first instruction generating module is used for generating a first switching instruction as the instruction, when the first match result indicates that the first touch gesture track matches with the first preset track, and the second match result indicates that the second touch gesture track matches with the second preset track.

In another embodiment, the verification information is a second match result obtained from the second electronic device by obtaining a second touch gesture track and verifying whether the second touch gesture track matches with a second preset track, and the verification information is transmitted to the electronic device by the second electronic device. In this case, the generating module 905 comprises a first verifying module and a first instruction generating module (not shown). The first verifying module is used for verifying whether the first touch gesture track matches with a first preset track to obtain a first match result. The first instruction generating module is used for generating a first switching instruction as the instruction, when the first match result indicates that the first touch gesture track matches with the first preset track, and the second match result indicates that the second touch gesture track matches with the second preset track.

In another embodiment, the verification information is a second touch gesture track detected by the second electronic device. In this case, the generating module 905 comprises a combining module, a verifying module and a first instruction generating module (not shown). The combing module is used for obtaining a combining track based on the first touch gesture track and the second touch gesture track. The verifying module is used for verifying whether the combining track matches with a preset combining track to obtain a match result. The first instruction generating module is used for generating a first switching instruction as the instruction, when the match result indicates that the combining track matches with the preset combining track.

In the above embodiment, when the instruction is a first switching instruction, the executing module 906 is used for causing the electronic device into a third work mode, wherein, the electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

Moreover, in an embodiment, the electronic device 900 further comprises: a transmitting module for transmitting the instruction to the second electronic device, wherein the second electronic device performs an operation corresponding to the instruction.

In particular, when the second electronic device is in the first work mode; and when the instruction is a first switching instruction, the second electronic device is caused to go into a third work mode, wherein, the second electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

In another embodiment, the electronic device 900 further comprises a third verifying module and a second instruction generating module. The third verifying module is used for verifying whether the first touch gesture track matches with a third preset track different from the first preset track, when the electronic device is in the second work mode. The second instruction generating module is used for generating a second switching instruction, when the first touch gesture track matches with the third preset track. The executing module 906 causes the electronic device into a fourth work mode in response to the second switching instruction, wherein, the electronic device performs an instruction in a first instruction set when in a first work mode, performs an instruction in a second instruction set when in a second work mode, and performs an instruction in a fourth instruction set when in a fourth work mode, the number of instructions in the first instruction set is less than that in the fourth instruction set, and the number of instructions in the second instruction set is less than that in the fourth instruction set.

The electronic device and the information processing method thereof have been described above with reference to FIGS. 7-9.

In the following, the information processing method according to another embodiment of the present disclosure will be described.

The information processing method according to the embodiment of the present disclosure is applied to an electronic device. The electronic device is such as a mobile terminal, a tablet, etc. The electronic device comprises a touch sensitive module for sensing the user's touch input. Moreover, the electronic device also comprises a display module for displaying image to user. Optionally, the touch sensitive module and the display module are arranged by lamination, to form a touch display module (which is also referred to as a touch display screen hereinafter).

The electronic device may be in one of two work modes. The two work modes are the stand-alone mode and the link mode respectively. In the stand-alone mode, the electronic device operates separately, just as that in the prior art. In the link mode, the electronic device, as a master electronic device, is coupled to one or more second electronic devices as the slave electronic devices, to form a display system. The second electronic devices and the electronic device may be of a same kind, for example, are all mobile terminals. The second electronic devices and the electronic device may be of different kinds. For example, the electronic device is a tablet, and the second electronic devices are mobile terminals. In the formed display system, one of the electronic device and the second electronic device acts as the master electronic device, and the remaining electronic devices act as the salve electronic devices. The detailed process of forming the display system by the electronic device and the second electronic device will be described later in detail. Moreover, it is to be noted that the display region of the electronic device displays the image generated based on the data of the electronic device itself on the display region in the stand-alone mode. A first combining image based on the data of the master electronic device among the electronic device and the second electronic device is displayed on the combining display region of the electronic device and the second electronic device in the link mode. The detailed operation will be described later.

In the following description, the stand-alone mode is referred to as the first work mode, and the link mode is referred to as the second work mode.

In the following, the information processing method according to the embodiment of the present disclosure will be described with reference to FIG. 10.

Figure 10:
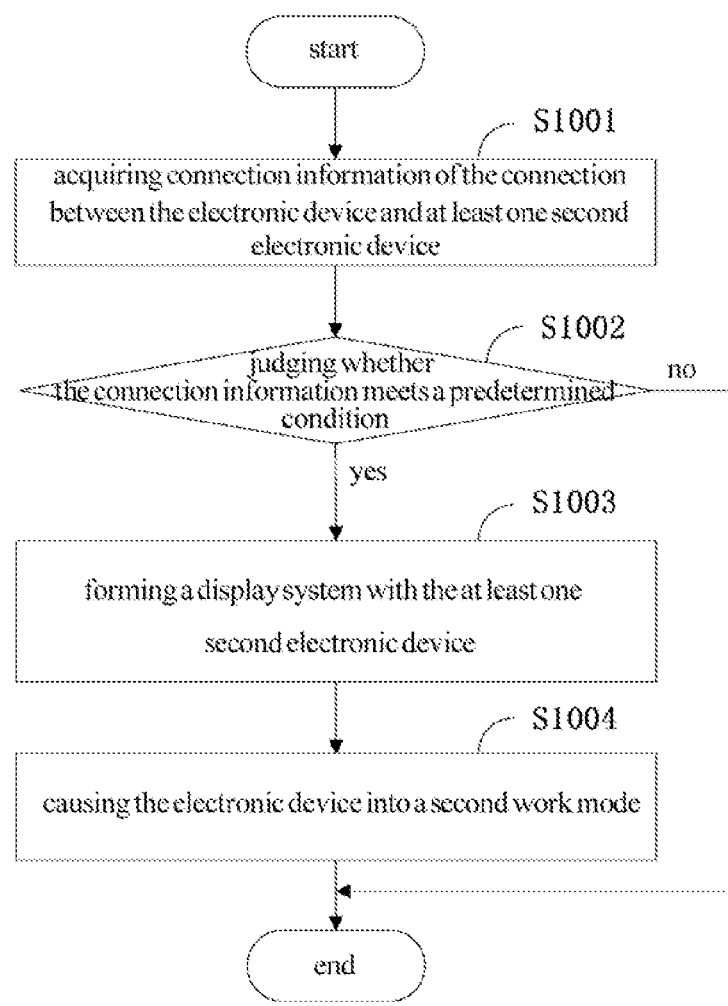
FIG. 10 is a flowchart of an information processing method according to an embodiment of the present disclosure.

As shown in FIG. 10, first, at step S1001, the information processing method acquires connection information of the connection between the electronic device and at least one second electronic device, when the electronic device is in a first work mode.

That is, when the electronic device is in the stand-alone mode, the information processing method acquires the connection information. The electronic device may be connected to one or more second electronic device in wire or wirelessly. Correspondingly, the information processing method may read the level information of the connection pin of the electronic device as the connection information of the electronic device to the second electronic device, for example. Alternatively, the information processing method may detect the signal level of the wireless connection port of the electronic device as the connection information of the electronic device to the second electronic device, for example.

Next, at step S1002, the information processing method judges whether the connection information meets a predetermined condition. In particular, for example, when they are connected in wire, the information processing method judges whether the level of the connection pin of the electronic device is above a threshold. For another example, when they are connected wirelessly, the information processing method detects the signal level of the wireless port of the electronic device, and judges whether the signal level is above a threshold. Of course, the above predetermined conditions are only examples. Those skilled in the art can judge whether the connection information meets the predetermined condition by other ways. For example, the information processing method may read the value (e.g. 1 or 0) of the flag representing the connection state in the electronic device, and judges whether the value is a predetermined value or not.

If the judgment result of step S1002 is negative, the information processing method ends.

On the other hand, if the judgment result of step S1002 is positive, i.e., if the information processing method judges that the connection information meets the predetermined condition, the information processing method goes to step S1003.

At step S1003, the information processing method forms a display system by the electronic device and the at least one second electronic device.

In the following, the operation of step S1003 will be described with reference to FIG. 11.

Figure 11:
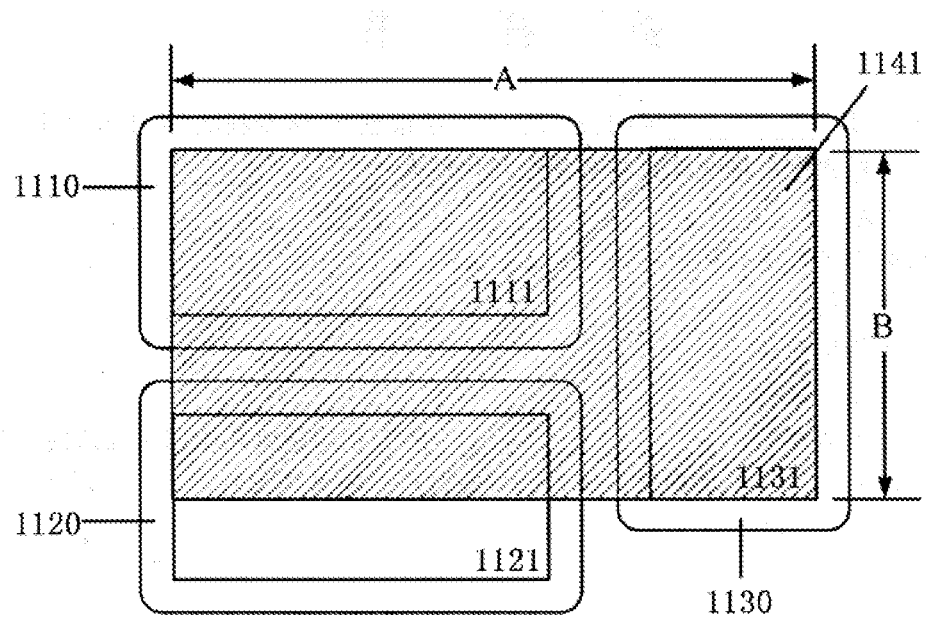
FIG. 11 is a display schematic diagram to which the information processing method according to the embodiment of the present disclosure is applied.

FIG. 11 shows how to form a display system by combining multiple electronic devices in the information processing method according to the embodiment of the present disclosure.

In particular, the electronic device as the master electronic device is coupled to one or more second electronic devices as the slave electronic device to form a display system. The second electronic devices and the electronic device may be of the same kind, such as a mobile phone. The second electronic devices and the electronic device may be of different kinds. For example, the electronic device is a tablet, and the second electronic device is a mobile phone. The display system may have an effective display region which may be referred to as a combining display region when appropriate in the following. The effective display region may be formed of a first part of the display region (hereinafter, referred to as the first display region when appropriate for distinguishing) of the master electronic device, and a second part of the display region (hereinafter, referred to as the second display region when appropriate for distinguishing) of the slave electronic device.

As shown in FIG. 11, the master electronic device 1110 comprises a first display screen 1111, the slave electronic device 1120 comprises a second display screen 1121, and the slave electronic device 1130 comprises a third display screen 1131. According to the embodiment of the present disclosure, when the master electronic device 1110 is coupled to the slave electronic devices 1120 and 1130, the location relationship information of the slave electronic devices 1120 and 1130 with respect to the master electronic device is obtained. Then, the information processing method obtains the first size information of the first display screen of the master electronic device and the second size information of the second display screen of each slave electronic device.

Then, the information processing method determines a display region according to the obtained location relationship information, the first size information of the first display screen 1111 and the second size information of the second display screens 1121 and 1131. The display region is consisted of the first display screen 1111 and the second display screens 1121 and 1131. In the example shown in FIG. 11, the display region may be at least in one of a traverse display manner and a latitude display manner. The first display screen and the second display screen are both rectangular display screens, and the effective display region may be set in advance as a rectangular region.

As shown in FIG. 11, when the display region is in a traverse display manner, the effective display region 1141 in the display region may be determined, so that the first length A of the effective display region 1141 traversely is longer than the length B of the effective display region 1141 latitudely, and the first length A is the longest length the effective display region 841 can achieve traversely, when the ratio of the first length to the second length of meets a first proportion condition. For example, it can be set in advance that the ratio of first length to the second length of the effective display region should meet $4:3 \leq X \leq 16:9$ in the traverse display manner, wherein, X=A:B.

Then, the first part of the first display screen and the second part of the second display screen constituting the effective display region 1141 are determined. In the example shown in FIG. 11, the whole display region of the first display screen 1111 is the first part. The whole display region of the third display screen 1131 is the second part. The display region of the second display screen 1121 which is contained in the effective display region 1141 is the second part. As described above, the slave electronic device 1120 may not display on the part of the display region of the second display screen 1121 which is not contained in the effective display region 1141.

The process when the display region is in a latitude display manner is similar to the above, and is not described here in detail.

That is to say, in the operation of step S1003, as an example, the information processing method may obtain the location relationship information of the second electronic device with respect to the electronic device, obtains the first size information of the first display screen of the electronic device and the second size information of the second display screen of the second electronic device, determines a display region according to the location relationship information, the first size information and the second size information. The display region is consisted of the first display screen and the second display screen. Then, the information processing method determines the combining display region in the display region.

In particular, the step of determining the effective display region of the display region comprises: determining the effective display region according to the display manner of the display region; and determining the effective parts of the first display screen and the second display screen constituting the effective display region.

The display region consisted of the first display screen and the second display screen may be a polygon. The display manner may comprise the first display manner and the second display manner.

When the display region is in the first display manner, the information processing method may determine the effective display region of the display region, so that the first length of the effective display region in the first direction is longer than the second length of the effective display region in the second direction. The ratio of the first length to the second length meets a first ratio condition, and the first length is the longest length of the effective display region that can be achieved in the first direction.

In another example, when the display region is in the second display manner, the information processing method may determine the effective display region in the display region, so that the first length of the effective display region in the first direction is shorter than or equal to the second length of the effective display region in the second direction. The ratio of the first length to the second length meets a second ratio condition, and the second length is the longest length of the effective display region that can be achieved in the second direction.

It is to be noted that the operation of step S1003 with reference to FIG. 11 is just an example. Those skilled in the art may form the display system by coupling the electronic device and the second electronic device in various ways. Moreover, in the operation of step S1003 with reference to FIG. 11, it is described with the coupling of the electronic device and two second electronic devices as an example.

However, those skilled in the art can understand that the information processing method may couple more or less electronic devices to form the display system.

In addition, the description is made with the electronic device as the master electronic device and one or more electronic devices as the slave electronic device as an example. However, it is just an example. In the information processing method according to the embodiment of the present disclosure, the electronic device may act as a slave electronic device, and one of the second electronic devices may act as the master electronic device.

In addition, in the above description, the electronic device and the second electronic device comprise the display screen. However, as described above, the display screen may be a touch display screen which also applies in the following description.

Next, at step S1004, the information processing method causes the electronic device into a second work mode.

In particular, the information processing method divides the display region of the electronic device into a first sub-region and a second sub-region. The first sub-region is a part of the combining display region described above.

As described above, the display region of the electronic device displays the first image generated based on the first data of the electronic device itself in the first work mode.

The information processing method causes the combining display region to display a first combining image generated based on the data of the master electronic device among the electronic device and the second electronic devices in the second work mode.

For example, when the electronic device is the master device, the information processing method generates a first combining image based on the data of the electronic device, determines a first partial image of the first combining image to be displayed in the first sub-region (corresponding to the effective part of the electronic device described above), and a second partial image of the first combining image to be displayed in other part (corresponding to the effective part of the second electronic device described above) of the combining display region. Then, the information processing method causes the first electronic device to display the first partial image, and transmits the second partial image to the second electronic device, so that the second partial image received from the electronic device is displayed on the effective part of the second electronic device.

When the electronic device is the slave electronic device, the second electronic device generates a first combing image by the above process, and determines the first partial image and the second partial image. Then, the second partial image is displayed on the effective part of the second electronic device itself, and the first partial image is transmitted to the electronic device. The information processing method receives the first partial image transmitted from the second electronic device, and displays the first partial image on the first sub-region.

Then, multiple display screens of multiple electronic devices may be combined to form a relatively large display region conveniently by the master electronic device according to the location information of the electronic devices connected with each other and the size information of the display screen of the electronic device. The display screens of the multiple electronic devices do not need to be combined in a fix way. Rather, the display region may be formed according to the location of the electronic devices connected with each other. Moreover, the screens of multiple electronic devices may be combined without additional image controllers, thereby the product cost is saved.

Moreover, in the information processing method according to the embodiment of the present disclosure, the information processing method may obtain the second data for displaying on the second sub-region from one of the electronic device and the second electronic device, and displays the second image on the second sub-region based on the second data.

That is, in an example, the information processing method may obtain the second data from the electronic device itself, and displays the second image based on the second data on the second sub-region.

In another example, the information processing method may receive the second data from the second electronic device, and display the second image based on the second data on the second sub-region.

In addition, in another example, the information processing method may also obtain the second data from outside (for example, a removable hard disk attached to the electronic device or a remote server communicated through network), and displays the second image of the second data on the second sub-region.

In the above example, the second image may be an image unrelated to the first combining image. That is, the display system may have the multi-task-window function.

Figure 13A:
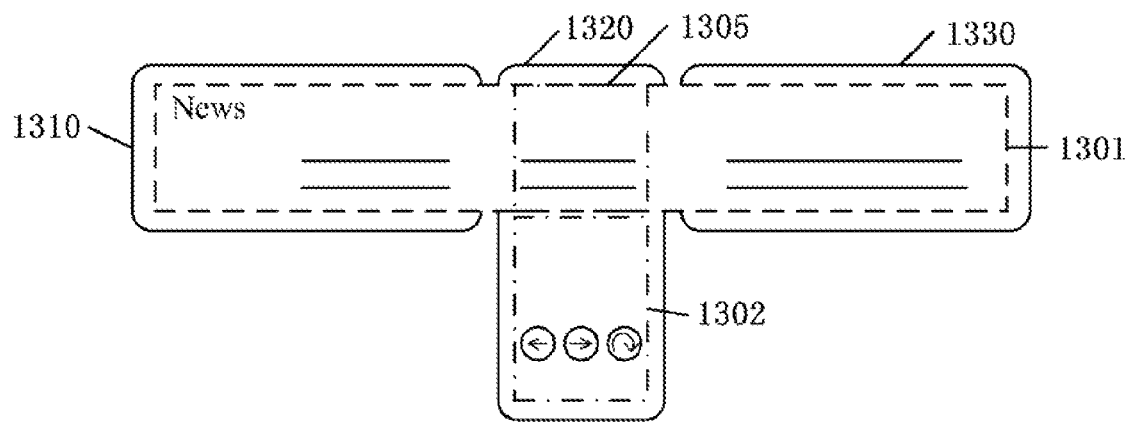
FIG. 13A and FIG. 13B are display schematic diagrams of the electronic device to which the information processing method according to the embodiment of the present disclosure is applied.

Alternatively, the second image may be a control image for controlling the first combining image, for example a manipulation window image. FIG. 13A is a schematic diagram of the display to which the information processing method according to the embodiment of the present disclosure is applied. In FIG. 13A, the electronic device 1320 to which the information processing method according to the embodiment of the present disclosure is applied forms a display system with the second electronic devices 1310 and 1330. The display system has a combining display region 1301 comprising a first sub-region 1305 of the electronic device 1320. Further, the electronic device 1320 also has a second sub-region 1302. In the example shown in FIG. 13A, the first combining image such as a web image is displayed on the combining display region 1301. A manipulation window image for controlling the web image is displayed on the second sub-region 1302. The information processing method may detect the click operation on the widget of the control image, such as back, refresh, next, etc. Then, the information processing method generates a second combining image corresponding to the gesture operation. That is, the information processing method generates a processing operation corresponding to the gesture operation. Then, the information processing method causes the combining display region to display the second combining image by a process similar to that of displaying the first combining image.

Figure 13B:
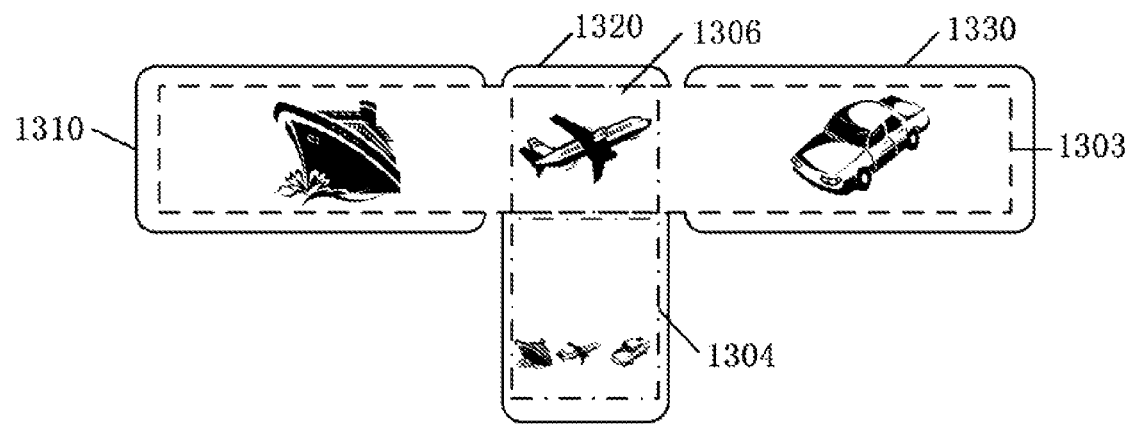

In another embodiment, the second image may be a thumbnail image corresponding to the first combining image. FIG. 13B is a schematic diagram of the display to which the information processing method according to the embodiment of the present disclosure is applied. Similar to FIG. 13A, the electronic device 1320 to which the information processing method according to the embodiment of the present disclosure is applied forms a display system with the second electronic devices 1310 and 1330. The display system has a combining display region 1301 comprising a first sub-region 1306. Further, the electronic device 1320 also has a second sub-region 1304. In the example shown in FIG. 13B, the first combining image such as an album image is displayed on the combining display region 1303. A thumbnail image corresponding to the first combining image is displayed on the second sub-region 1304. The information processing method may detect the zoom operation or the shift operation on the thumbnail image. Then, the information processing method generates a second combining image corresponding to the gesture operation. That is, the information processing method generates a processing instruction corresponding to the gesture operation, and generates the second combining image as the performing result of the processing instruction. Then, the information processing method causes the combining display region to display the second combining image by a process similar to that of displaying the first combining image.

In addition, it is to be noted that, in the embodiment of the present disclosure, the information processing method may further combine the partial image of the second combining image to be displayed on the first sub-region of the electronic device and the second image to be displayed on the second sub-region of the electronic device, and cause the electronic device to display the resultant combining image.

Then, in the embodiment of the present disclosure, not only a big combining display region is formed by combining multiple display screens of multiple electronic devices conveniently, but also the remaining display regions other than the combining regions of the electronic devices are fully used, which not only can be used to display content irrelated to the content displayed on the combining display region to achieve multi task windows, but also can be used to display content related to the content displayed on the combining display region to make the user operation conveniently and improve the user experience in comparison with the operation on a combining display region with a relatively large size.

In addition, in another embedment, in the information processing method according to the embodiment of the present disclosure described with reference to FIG. 10, when the electronic device is the master electronic device, the information processing method may further detect a gesture operation on the second sub-region, and generate a second combining image corresponding to the gesture operation. That is, the information processing method generates a processing instruction corresponding to the gesture operation, and generates a resultant second combining image. Then, the information processing method displays the second combining image on the combining display region by similar processes.

On the other hand, when the second electronic device is the master electronic device, the information processing method may further detect a gesture operation on the second sub-region, and transmit the information on the gesture operation to the second electronic device. The second electronic device as the master electronic device generates a second combining image corresponding to the gesture operation, and displays the second combining image on the combining display region by similar processes.

That is, in the embodiment described above, not only a big combining display region is formed by combining multiple display screens of multiple electronic devices conveniently, but also the remaining display regions other than the combining regions of the electronic devices are fully used. Different from the above embodiment, the information processing method according to the embodiment of the present disclosure mainly utilize the touch sensing function of the remaining touch display region. That is, the information processing method use the remaining touch display region as a touch pad. Therefore, in the present disclosure, when the electronic device is configured with multiple display elements which can be controlled to turn on/off respectively, the information processing method may further disable the display elements corresponding to the second sub-region.

Thereby, the information processing method according to the embodiment of the present disclosure makes the user operation conveniently and improves the user experience in comparison with the operation on a combining display region with a relatively large size.

The information processing method according to the embodiment of the present disclosure has been described above.

In the following, an electronic device according to the embodiment of the present disclosure will be described with reference to FIG. 12.

Figure 12:
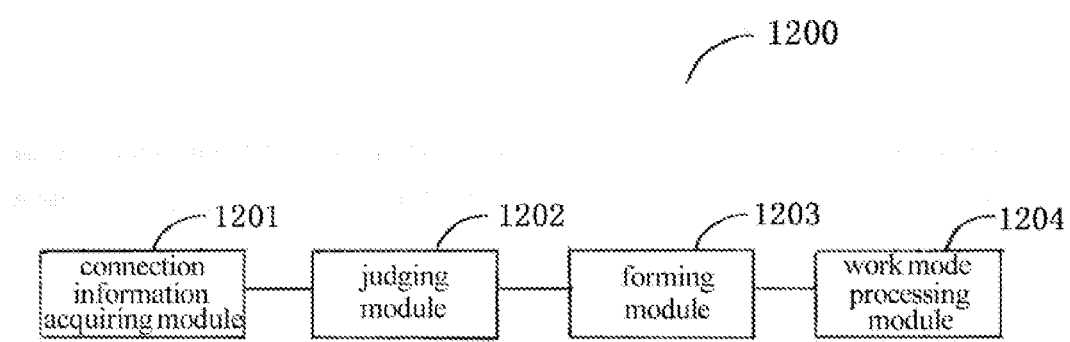
FIG. 12 is a block diagram of main configuration of the electronic device according to an embodiment of the present disclosure.

As shown in FIG. 12, the electronic device according to the embodiment of the present disclosure comprises a connection information acquiring module 1201, a judging module 1202, a forming module 1203 and a work mode processing module 1204.

The connection information acquiring module 1201 is used for acquiring connection information of the connection between the electronic device and at least one second electronic device, when the electronic device is in a first work mode.

The judging module 1202 is used for judging whether the connection information meets a predetermined condition.

The forming module 1203 is used for forming a display system with the at least one second electronic device, when a predetermined condition is met.

The work mode processing module 1204 is used for causing the electronic device into a second work mode.

A first image based on a first data of the electronic device itself is displayed on a display region of the electronic device in the first work mode. The display region of the electronic device is divided into a first sub-region and a second sub-region in the second work mode, the display system has a combining display region containing the first sub-region, and a first combining image based on a master device among the electronic device and the second electronic device is displayed on the combining display region.

In an embodiment, the electronic device 1200 further comprises: a display data acquiring module for acquiring a second data for displaying on the second sub-region from one of the electronic device and the second electronic device in the second work mode; and a display processing module for displaying a second image on the second sub-region based on the second data.

In another embodiment, when the electronic device is the master device, the electronic device 1200 further comprises: a detecting module for detecting a gesture operation on the second sub-region; a generating module for generating a second combining image corresponding to the gesture operation; and a display processing module for causing the combining display region to display the second combining image.

In another embodiment, when the second electronic device is the master device, the electronic device 1200 further comprises: a detecting module for detecting a gesture operation on the second sub-region; and a transmitting module for transmitting information on the gesture operation to the second electronic device; wherein, the second electronic device generates a second combining image corresponding to the gesture operation, and causing the combining display region to display the second combining image.

In another embodiment, the second image is a thumbnail image corresponding to the first combining image, and the electronic device further comprises: a detecting module for detecting a gesture operation on the thumbnail image; a generating module for generating a second combining image corresponding to the gesture operation; and a display processing module for causing the combining display region to display the second combining image.

In another embodiment, the electronic device 1200 further comprises: a disabling module for disabling display elements corresponding to the second sub-region in the electronic device.

The electronic device comprises a first display screen, the second electronic device comprises a second display screen; and the forming module 1203 comprises: a location information obtaining module for obtaining location relationship information of the second electronic device with respect to the electronic device; a size information obtaining module for obtaining first size information of the first display screen of the electronic device and second size information of the second display screen of the second electronic device; a first determining module for determining the display region according to the location relationship information, the first size information and the second size information; wherein, the display region is formed of the first display screen and the second display screen; and a second determining module for determining the combining display region in the display region.

The detailed configuration and the process of the electronic device 1200 have been described in the information processing method with reference to FIG. 10, and will not be described here in detail.

In the electronic device according to the embodiment of the present disclosure described above, not only a big combining display region is formed by combining multiple display screens of multiple electronic devices conveniently, but also the remaining display regions other than the combining regions of the electronic devices are fully used, which not only can be used to display content irrelated to the content displayed on the combining display region to achieve multi task windows, but also can be used to display content related to the content displayed on the combining display region to make the user operation conveniently and improve the user experience in comparison with the operation on a combining display region with a relatively large size.

Moreover, in the electronic device according to the embodiment of the present disclosure, the remaining touch display region other than the combining region of the multiple electronic devices may be fully used. In particular, the electronic device uses the remaining touch display region as a touch pad. Therefore, the electronic device according to the embodiment of the present disclosure makes the user operation conveniently and improves the user experience in comparison with the operation on a combining display region with a relatively large size.

The electronic device and the information processing method according to the embodiments of the present disclosure have been described above with reference to FIGS. 10-13.

It should be noted that, in this specification, the terms "comprising", "including" or any other variant are intended to cover a non-exclusive inclusion, so that the process, method, article or device comprising a series of elements comprises not only those elements, but also comprises other elements not expressly listed, or further comprises elements inherent in this process, method, article, or device. In the case of no more restrictions, the elements defined by the statement "comprises a . . . ", do not preclude the existence of additional identical elements in the process, method, article or device comprising the elements.

Finally, it should be noted that, the above-described series of processes comprise not only the processes performed in time series in the order described herein, but also comprise the processes performed concurrently or separately, instead of in chronological order.

Through the above description of the embodiments, the skilled in the art can clearly understand that the present invention can be implemented by means of software plus a necessary hardware platform; certainly, it can also be implemented entirely by hardware. Based on such understanding, all or part of the contribution of the technical solution of the present invention to the background art, may be embodied in the form of a software product, which can be stored in a storage medium, such as a ROM/RAM, hard disk, optical disk, etc., comprising a plurality of instructions for allowing a computer device (which may be a personal computer, a server, or a network device, etc.) to perform the methods described in various embodiments or in some portion of the embodiments of the present invention.

The above has described the present invention in detail, and specific examples are used herein to explain the principles and embodiments of the invention. However, the above description of the embodiments is only used to help understanding the methods and core ideas of the present invention; meanwhile, for the ordinary skilled in the art, based on the ideas of the invention, variations can be made both in implementations and application ranges; in summary, the content of this specification should not be understood as limitative to the present invention.

The invention claimed is:

1. A method for determining a display region, applied in any one of multiple electronic devices as a master electronic device wirelessly connected to any one of the multiple electronic devices as a slave electronic device, the master electronic device comprising a first display screen, each slave electronic device of the at least one slave electronic device comprising a second display screen, the method comprising:

the master electronic device obtaining location relationship information of each slave electronic device of the at least one slave electronic device with respect to the master electronic device, when connecting with the at least one slave electronic device;

the master electronic device obtaining a first size of the first display screen of the master electronic device, and a second size of the second display screen of each slave electronic device of the at least one slave electronic device;

the master electronic device determining a display region that consists of the first display screen of the first size and the second display screen of the second size, based on the location relationship information, the first size and the second size; and determining a longest side and a widest side of the display region, and determining a regular shape according to the longest side and the widest side, so as to determine a first effective display region of the first display screen and a second effective display region of the second display screen, wherein the first effective display region and the second effective display region form one of multiple effective display regions within the display screen, and each effective display region corresponds to one of multiple display modes, wherein the first effective display region is smaller that or equal to the area of the display region of the first display screen, the second effective display region is smaller than or equal to the area of the display region of the second display screen.

2. The method of claim 1, wherein, the step of obtaining location relationship information of each slave electronic device of the at least one slave electronic device with respect to the master electronic device, when connecting with the at least one slave electronic device comprises:
   re-obtaining the location relationship information of each slave electronic device of the at least one slave electronic device with respect to the master electronic device, based on the detection of a location change of any electronic device; and
   the step of determining the display region, based on the location relationship information, the first size and the second size comprises:
      determining the display region, based on the re-obtained location relationship information, the first size and the second size.

3. The method of claim 1, wherein, the step of obtaining location relationship information of each slave electronic device of the at least one slave electronic device with respect to the master electronic device, when connecting with the at least one slave electronic device comprises:
   obtaining the location relationship information with respect to each slave electronic device of the at least one slave electronic device, based on the detection of the location of the at least one slave electronic device; or
   receiving location information transmitted by each slave electronic device of the at least one slave electronic device, and obtaining the location relationship information with respect to each slave electronic device of the at least one slave electronic device.

4. The method of claim 1, wherein, the step of obtaining a second size of the second display screen of each slave electronic device of the at least one slave electronic device comprises:
   obtaining the second size of the second display screen of each slave electronic device of the at least one slave electronic device, based on size information transmitted by each slave electronic device of the at least one slave electronic device; or
   obtaining the second size of the second display screen of each slave electronic device of the at least one slave electronic device, based on a set coordinate system.

5. A method for switching display modes, applied to a master electronic device as any one of multiple electronic devices wirelessly connected to any one of the multiple electronic devices as a slave electronic device, the method comprising:
   the master electronic device obtaining information to be displayed when the display mode is to be switched;
   the master electronic device judging whether there is at least one other display mode than the current display mode, when connecting with the at least one slave electronic device; and
   the master electronic device switching to one display mode of the other display mode when the judging result is positive;
   wherein the master electronic device comprises a first display screen, the slave electronic device comprises a second display screen, a first effective display region of the first display screen and a second effective display region of the second display screen form one of multiple effective display regions that is determined by determining a longest side and a widest side of a display region and determining a regular shape according to the longest side and the widest side, and each effective display region corresponds to one of the display modes, wherein, the first effective display region is smaller than or equal to the area of the display region of the first display screen, the second effective display region is smaller than or equal to the area of the display region of the second display screen.

6. An electronic device as any one of multiple electronic devices wireless connected to any one of the multiple electronic devices as a slave electronic device, the electronic device comprising a first display screen, each slave electronic device of the at least one slave electronic device comprising a second display screen, the electronic device comprising:
   a first obtaining module configured to obtain location relationship information of each slave electronic device of the at least one slave electronic device with respect to the master electronic device, when connecting with the at least one slave electronic device;
   a second obtaining module configured to obtain a first size of the first display screen of the master electronic device, and a second size of the second display screen of each slave electronic device of the at least one slave electronic device;
   a first determining module configured to determine a display region that consists of the first display screen of the first size and the second display screen of the second size, based on the location relationship information, the first size and the second size; and
   a second determining module configured to determine a longest side and a widest side of the display region, and determine a regular shape according to the longest side and the widest side, so as to determine a first effective display region of the first display screen and a second effective display region of the second display screen, wherein the first effective display region and the second effective display region form one of multiple effective display regions within the display screen, and each effective display region corresponds to one of multiple display modes, wherein, the first effective display region is smaller than or equal to the area of the display region of the first display screen, the second effective display region is smaller than or equal to the area of the display region of the second display screen.

7. The electronic device of claim 6, wherein,
   the first obtaining module is further configured to re-obtain the location relationship information of each slave electronic device of the at least one slave electronic device with respect to the master electronic device, based on the detection of a location change of any electronic device; and
   the second determining module is further configured to determine the display region, based on the re-obtained location relationship information, the first size and the second size.

8. The electronic device of claim 6, wherein, the first obtaining module is further configured to obtain the location relationship information with respect to each slave electronic device of the at least one slave electronic device, based on the detection of the location of the at least one slave electronic device; or receive location information transmitted by each slave electronic device of the at least one slave electronic device, and obtain the location relationship information with respect to each slave electronic device of the at least one slave electronic device.

9. The electronic device of claim 6, wherein, the second obtaining module is configured to obtain the second size of the second display screen of each slave electronic device of the at least one slave electronic device, based on size information transmitted by each slave electronic device of the at least one slave electronic device; or obtain the second size of the second display screen of each slave electronic device of the at least one slave electronic device, based on a set coordinate system.

10. An electronic device applied to a master electronic device as any one of multiple electronic devices wirelessly connected to any one of the multiple electronic devices as a slave electronic device, the electronic device comprising:
a third obtaining module configured to obtain information to be displayed when the display mode is to be switched;
a judging module configured to judge whether there is at least one other display mode than the current display mode, when connecting with the at least one slave electronic device; and
a switching module configured to switch to one display mode of the other display mode when the judging result is positive;
wherein the master electronic device comprises a first display screen, the slave electronic device comprises a second display screen, a first effective display region of the first display screen and a second effective display region of the second display screen form one of multiple effective display regions that is determined by determining a longest side and a widest side of a display region and determining a regular shape according to the longest side and the widest side, and each effective display region corresponds to one of the display modes, wherein, the first effective display region is smaller than or equal to the area of the display region of the first display screen, the second effective display region is smaller than or equal to the area of the display region of the second display screen.

11. An information processing method applied to any one of multiple electronic devices as a master electronic device, the information processing method comprising:
the master electronic device detecting a touch gesture by user to obtain a first touch gesture track;
the master electronic device acquiring state information of the electronic device;
the master electronic device judging whether the electronic device is in a first work mode or a second work mode, based on the state information;
the master electronic device receiving verification information from any one of the multiple electronic devices as a second electronic device, when the electronic device is in the first work mode;
the master electronic device generating a corresponding instruction based on the first touch gesture track and the verification information; and
the master electronic device causing the electronic device to perform an operation corresponding to the instruction;
wherein in the first work mode the electronic device is wirelessly connected to the second electronic device and the electronic device comprises a first display screen; the second electronic device comprises a second display screen; and a first effective display region of the first display screen and a second effective display region of the second display screen form one of multiple effective display regions that is determined by determining a longest side and a widest side of a display region and determining a regular shape according to the longest side and the widest side, and each effective display region corresponds to one of the display modes, wherein, the first effective display region is smaller that or equal to the area of the display region of the first display screen, the second effective display region is smaller that or equal to the area of the display region of the second display screen.

12. The information processing method of claim 11, wherein, the verification information is a second touch gesture track detected by the second electronic device; and
the step of generating the corresponding instruction comprises:
verifying whether the first touch gesture track matches with a first preset track to obtain a first match result;
verifying whether the second touch gesture track matches with a second preset track to obtain a second match result; and
generating a first switching instruction as the instruction, when the first match result indicates that the first touch gesture track matches with the first preset track, and the second match result indicates that the second touch gesture track matches with the second preset track.

13. The information processing method of claim 11, wherein, the verification information is a second match result obtained from the second electronic device by obtaining a second touch gesture track and verifying whether the second touch gesture track matches with a second preset track, and the verification information is transmitted to the electronic device by the second electronic device; and
the step of generating the corresponding instruction comprises:
verifying whether the first touch gesture track matches with a first preset track to obtain a first match result; and
generating a first switching instruction as the instruction, when the first match result indicates that the first touch gesture track matches with the first preset track, and the second match result indicates that the second touch gesture track matches with the second preset track.

14. The information processing method of claim 11, wherein, the verification information is a second touch gesture track detected by the second electronic device; and
the step of generating the corresponding instruction comprises:
obtaining a combining track based on the first touch gesture track and the second touch gesture track;
verifying whether the combining track matches with a preset combining track to obtain a match result; and
generating a first switching instruction as the instruction, when the match result indicates that the combining track matches with the preset combining track.

15. The information processing method of claim 11, wherein, when the instruction is a first switching instruction, the step of performing an operation corresponding to the instruction comprises:
causing the electronic device into a third work mode, wherein, the electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

16. The information processing method of claim 11, further comprising: transmitting the instruction to the second electronic device, wherein the second electronic device performs the operation corresponding to the instruction.

17. An electronic device as a master electronic device that is any one of multiple electronic devices comprising:
- a detecting module configured to detect a touch gesture by user to obtain a first touch gesture track;
- an acquiring module configured to acquire state information of the electronic device;
- a judging module configured to judge whether the electronic device is in a first work mode or a second work mode, based on the state information;
- a receiving module configured to receive verification information from any one of the multiple electronic devices as a second electronic device, when the electronic device is in the first work mode;
- a generating module configured to generate a corresponding instruction based on the first touch gesture track and the verification information; and
- an executing module for causing the electronic device to perform an operation corresponding to the instruction;
- wherein in the first work mode the electronic device is wirelessly connected to the second electronic device and the electronic device comprises a first display screen; the second electronic device comprises a second display screen; and a first effective display region of the first display screen and a second effective display region of the second display screen form one of multiple effective display regions that is determined by determining a longest side and a widest side of a display region and determining a regular shape according to the longest side and the widest side, and each effective display region corresponds to one of the display modes, wherein, the first effective display region is smaller than or equal to the area of the display region of the first display screen, the second effective display region is smaller than or equal to the area of the display region of the second display screen.

18. The electronic device of claim 17, wherein, the verification information is a second touch gesture track detected by the second electronic device; and the generating module comprises:
- a first verifying module configured to verify whether the first touch gesture track matches with a first preset track to obtain a first match result;
- a second verifying module configured to verify whether the second touch gesture track matches with a second preset track to obtain a second match result; and
- a first instruction generating module configured to generate a first switching instruction as the instruction, when the first match result indicates that the first touch gesture track matches with the first preset track, and the second match result indicates that the second touch gesture track matches with the second preset track.

19. The electronic device of claim 17, wherein, the verification information is a second match result obtained from the second electronic device by obtaining a second touch gesture track and verifying whether the second touch gesture track matches with a second preset track, and the verification information is transmitted to the electronic device by the second electronic device; and the generating module comprises:
- a first verifying module configured to verify whether the first touch gesture track matches with a first preset track to obtain a first match result; and
- a first instruction generating module configured to generate a first switching instruction as the instruction, when the first match result indicates that the first touch gesture track matches with the first preset track, and the second match result indicates that the second touch gesture track matches with the second preset track.

20. The electronic device of claim 17, wherein, the verification information is a second touch gesture track detected by the second electronic device; and the generating module comprises:
- a combing module configured to obtain a combining track based on the first touch gesture track and the second touch gesture track;
- a verifying module configured to verify whether the combining track matches with a preset combining track to obtain a match result; and
- a first instruction generating module configured to generate a first switching instruction as the instruction, when the match result indicates that the combining track matches with the preset combining track.

21. The electronic device of claim 17, wherein, when the instruction is a first switching instruction, the executing module is configured to cause the electronic device into a third work mode, wherein, the electronic device performs an instruction in a first instruction set when in a first work mode, performs an instruction in a second instruction set when in a second work mode, and performs an instruction in a third instruction set when in a third work mode, the number of instructions in the first instruction set is less than that in the third instruction set, and the number of instructions in the second instruction set is less than that in the third instruction set.

22. The electronic device of claim 17, further comprising: a transmitting module configured to transmit the instruction to the second electronic device, wherein the second electronic device performs an operation corresponding to the instruction.

23. An information processing method applied to any one of multiple electronic devices as a master electronic device, the information processing method comprising:
- acquiring connection information of the connection between the electronic device and at least one second electronic device, when the electronic device is in a first work mode;
- judging whether the connection information meets a predetermined condition;
- forming a display system with the any one of the multiple electronic devices as a second electronic device, when the predetermined condition is met; and
- causing the electronic device into a second work mode;
- wherein, a first image based on a first data of the electronic device itself is displayed on a display region of the electronic device in the first work mode;
- in the second work mode, the display region of the electronic device is divided into a first sub-region and a second sub-region, the display system has a combining display region containing the first sub-region, and a first combining image based on data of a master device among the electronic device and the second electronic device is displayed on the combining display region;
- wherein in the second work mode the electronic device is wirelessly connected to the second electronic device and the electronic device comprises a first display screen; the second electronic device comprises a second display screen; and a first effective display region of the first display screen and a second effective display region of the second display screen form one of multiple effective display regions that is determined by determining a longest side and a widest side of a display region and determining a regular shape according to the longest side and the widest side, and each effective display region corresponds to one of the display modes, wherein, the first effective display region is smaller than or equal to the area of the display region of the first display screen, the second effective display region is smaller than or equal to the area of the display region of the second display screen.

24. The information processing method of claim 23, further comprising:
acquiring a second data for displaying on the second sub-region from one of the electronic device and the second electronic device in the second work mode; and
displaying a second image on the second sub-region based on the second data.

25. The information processing method of claim 23, wherein, when the electronic device is the master device, the method further comprises:
detecting a gesture operation on the second sub-region;
generating a second combining image corresponding to the gesture operation; and
causing the combining display region to display the second combining image.

26. The information processing method of claim 23, wherein, when the second electronic device is the master device, the method further comprises:
detecting a gesture operation on the second sub-region; and
transmitting information on the gesture operation to the second electronic device;
wherein, the second electronic device generates a second combining image corresponding to the gesture operation, causing the combining display region to display the second combining image.

27. The information processing method of claim 24, wherein, the second image is a thumbnail image corresponding to the first combining image, and the information processing method further comprises:
detecting a gesture operation on the thumbnail image;
generating a second combining image corresponding to the gesture operation; and
causing the combining display region to display the second combining image.

28. The information processing method of claim 25, further comprising: disabling display elements corresponding to the second sub-region in the electronic device.

29. An electronic device as a master electronic device that is any one of multiple electronic devices comprising:
a connection information acquiring module configured to acquire connection information of the connection between the electronic device and any one of the multiple electronic devices as a second electronic device, when the electronic device is in a first work mode;
a judging module configured to judge whether the connection information meets a predetermined condition;
a forming module configured to form a display system with the at least one second electronic device, when a predetermined condition is met; and
a work mode processing module configured to cause the electronic device into a second work mode;
wherein, a first image based on a first data of the electronic device itself is displayed on a display region of the electronic device in the first work mode;
in the second work mode, the display region of the electronic device is divided into a first sub-region and a second sub-region, the display system has a combining display region containing the first sub-region, and a first combining image based on data of a master device among the electronic device and the second electronic device is displayed on the combining display region;
wherein in the second work mode, the electronic device is wirelessly connected to the second electronic device and the electronic device comprises a first display screen; the second electronic device comprises a second display screen; and a first effective display region of the first display screen and a second effective display region of the second display screen form one of multiple effective display regions that is determined by determining a longest side and a widest side of a display region and determining a regular shape according to the longest side and the widest side, and each effective display region corresponds to one of the display modes, wherein, the first effective display region is smaller than or equal to the area of the display region of the first display screen, the second effective display region is smaller than or equal to the area of the display region of the second display screen.

30. The electronic device of claim 29, further comprising:
a display data acquiring module configured to acquire a second data for displaying on the second sub-region from one of the electronic device and the second electronic device in the second work mode; and
a display processing module configured to display a second image on the second sub-region based on the second data.

31. The electronic device of claim 29, wherein, when the electronic device is the master device, the electronic device further comprises:
a detecting module configured to detect a gesture operation on the second sub-region;
a generating module configured to generate a second combining image corresponding to the gesture operation; and
a display processing module configured to cause the combining display region to display the second combining image.

32. The electronic device of claim 29, wherein, when the second electronic device is the master device, the electronic device further comprises:
a detecting module configured to detect a gesture operation on the second sub-region; and
a transmitting module configured to transmit information on the gesture operation to the second electronic device;
wherein, the second electronic device generates a second combining image corresponding to the gesture operation, causing the combining display region to display the second combining image.

33. The electronic device of claim 30, wherein, the second image is a thumbnail image corresponding to the first combining image, and the electronic device further comprises:
a detecting module configured to detect a gesture operation on the thumbnail image;
a generating module configured to generate a second combining image corresponding to the gesture operation; and a display processing module configured to cause the combining display region to display the second combining image.

34. The electronic device of claim 31, further comprising:
a disabling module configured to disable display elements corresponding to the second sub-region in the electronic device.

* * * * *